US012776942B2

(12) United States Patent
Regev et al.

(10) Patent No.: US 12,776,942 B2
(45) Date of Patent: Oct. 27, 2026

(54) COMPRESSED POWER AMPLIFIER MODEL REPORTS FOR OVER THE AIR DIGITAL PRE-DISTORTION TRAINING

(71) Applicant: QUALCOMM Incorporated, San Diego, CA (US)

(72) Inventors: Aviv Regev, Tel Aviv (IL); Ronen Shaked, Kfar Saba (IL); Amit Bar-Or Tillinger, Tel-Aviv (IL); Gideon Shlomo Kutz, Ramat Hasharon (IL); Amit Moses, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 19/036,526

(22) Filed: Jan. 24, 2025

(65) Prior Publication Data

US 2026/0222272 A1 Jul. 30, 2026

(51) Int. Cl.
*H04L 27/36* (2006.01)
*H04W 24/10* (2009.01)

(52) U.S. Cl.
CPC ........... *H04L 27/367* (2013.01); *H04W 24/10* (2013.01)

(58) Field of Classification Search
CPC ............................. H04L 27/367; H04W 24/10
See application file for complete search history.

(56) References Cited

U.S. PATENT DOCUMENTS

| | | | | |
|---|---|---|---|---|
| 11,290,138 | B1 * | 3/2022 | Kutz | H04B 1/0475 |
| 11,296,735 | B1 * | 4/2022 | Kutz | H04B 1/0475 |
| 2021/0367686 | A1 * | 11/2021 | Gutman | H04B 1/0475 |
| 2022/0038229 | A1 * | 2/2022 | Levy | H04L 5/0048 |
| 2023/0014042 | A1 | 1/2023 | Barak et al. | |
| 2023/0179238 | A1 * | 6/2023 | Kutz | H04W 4/06 375/297 |
| 2023/0361794 | A1 * | 11/2023 | Uziel | H04B 1/0475 |
| 2024/0031211 | A1 * | 1/2024 | Meir | H04B 1/0475 |
| 2024/0080230 | A1 * | 3/2024 | Shaked | H04L 27/364 |
| 2024/0097722 | A1 * | 3/2024 | Kutz | H04B 1/0475 |

OTHER PUBLICATIONS

International Search Report and Written Opinion—PCT/US2025/059041—ISA/EPO—Apr. 1, 2026.

Tanimura T., et al., "Soft Decision Forward Error Correction over Nonlinear Transmission of 1-Tb/s Superchannel", 2014 The European Conference on Optical Communication (ECOC) Systematic Paris Region Systems and ICT Cluster, Sep. 21, 2014, pp. 1-3, XP032689392, The Whole Document.

* cited by examiner

*Primary Examiner* — Jaison Joseph
(74) *Attorney, Agent, or Firm* — Harrity & Harrity LLP

(57) ABSTRACT

Various aspects of the present disclosure generally relate to wireless communication. In some aspects, a network node may transmit, to multiple user equipments (UEs), respective over-the-air digital pre-distortion (OTA-DPD) training signals, and may receive, from the multiple UEs, multiple PA model reports. The network node may perform a DPD correction procedure in accordance with the multiple PA model reports. Additionally or alternatively, the network node may receive, from a UE, a first and second PA model report in accordance with a first and second OTA-DPD training signal, respectively. The first PA model report may indicate a set of data bits and a first set of parity bits and the second PA model report may indicate a second set of parity bits that enable information associated with the second PA model report to be decoded using at least the second set of parity bits and the set of data bits.

30 Claims, 12 Drawing Sheets

COMPRESSED POWER AMPLIFIER MODEL REPORTS FOR OVER THE AIR DIGITAL PRE-DISTORTION TRAINING

FIELD OF THE DISCLOSURE

Aspects of the present disclosure generally relate to wireless communication and specifically relate to techniques, apparatuses, and methods associated with compressed power amplifier model reports for over-the-air digital pre-distortion training.

BACKGROUND

Wireless communication systems are widely deployed to provide various services, which may involve carrying or supporting voice, text, other messaging, video, data, or other traffic. Typical wireless communication systems may employ multiple-access radio access technologies (RATs) capable of supporting communication among multiple wireless communication devices including user devices or other devices by sharing the available system resources (for example, time domain resources, frequency domain resources, spatial domain resources, or device transmit power, among other examples). Such multiple-access RATs are supported by technological advancements that have been adopted in various telecommunication standards, which define common protocols that enable different wireless communication devices to communicate on a local, municipal, national, regional, or global level.

An example telecommunication standard is New Radio (NR). NR, which may also be referred to as 5G, is part of a continuous mobile broadband evolution promulgated by the Third Generation Partnership Project (3GPP). NR (and other RATs beyond NR) may be designed to better support enhanced mobile broadband (eMBB) access, Internet of things (IoT) networks or reduced capability device deployments, and ultra-reliable low latency communication (URLLC) applications. To support these verticals, NR systems may be designed to implement a modularized functional infrastructure, a disaggregated and service-based network architecture, network function virtualization, network slicing, multi-access edge computing, millimeter wave (mmWave) technologies including massive multiple-input multiple-output (MIMO), licensed and unlicensed spectrum access, non-terrestrial network (NTN) deployments, sidelink and other device-to-device direct communication technologies (for example, cellular vehicle-to-everything (CV2X) communication), multiple-subscriber implementations, high-precision positioning, or radio frequency (RF) sensing, among other examples. As the demand for connectivity continues to increase, further improvements in NR may be implemented, and other RATs, such as 6G and beyond, may be introduced to enable new applications and facilitate new use cases.

In some wireless communication systems, a transmitter or receiver may implement pre-processing techniques or post-processing techniques, respectively. For example, a signal may be pre-processed by the transmitter to compress a peak-to-average power ratio (PAPR) associated with the signal, such as by using crest factor reduction (CFR) processing or digital pre-distortion (DPD) processing. CFR processing may reduce the dynamic range of the signal, while DPD processing may reduce non-linear distortion to less than a threshold level with a reduced level of power back-off, thereby increasing power efficiency relative to avoiding non-linear distortion using only a power back-off.

Moreover, the receiver may apply digital post distortion (DPoD) processing to the signal to allow the transmitter to transmit close to the power amplifier (PA) compression point by reconstructing, on the receiver side, transmitter non-linearities and subtracting the transmitter non-linearities from the received signal in an iterative manner.

SUMMARY

Some aspects described herein relate to a method of wireless communication by a user equipment (UE). The method may include receiving a first over-the-air digital pre-distortion (OTA-DPD) training signal. The method may include transmitting a first power amplifier (PA) model report in accordance with the first OTA-DPD training signal, the first PA model report indicating a set of data bits and a first set of parity bits. The method may include receiving a second OTA-DPD training signal. The method may include transmitting a second PA model report in accordance with the second OTA-DPD training signal, the second PA model report indicating at least a second set of parity bits that enable information associated with the second PA model report to be decoded using at least the second set of parity bits and the set of data bits.

Some aspects described herein relate to a method of wireless communication by a network node. The method may include transmitting, to multiple UEs, respective OTA-DPD training signals. The method may include receiving, from the multiple UEs in accordance with the OTA-DPD training signals, multiple PA model reports, the multiple PA model reports including at least a first PA model report indicating a set of data bits and a first set of parity bits, and a second PA model report indicating at least a second set of parity bits that enable information associated with the second PA model report to be decoded using at least the second set of parity bits and the set of data bits. The method may include performing a DPD correction procedure for a transmission chain in accordance with the multiple PA model reports.

Some aspects described herein relate to a UE for wireless communication. The UE may include a processing system that includes one or more processors and one or more memories coupled with the one or more processors. The processing system may be configured to cause the UE to receive a first OTA-DPD training signal. The processing system may be configured to cause the UE to transmit a first PA model report in accordance with the first OTA-DPD training signal. The processing system may be configured to cause the UE to receive a second OTA-DPD training signal. The processing system may be configured to cause the UE to transmit a second PA model report in accordance with the second OTA-DPD training signal.

Some aspects described herein relate to a network node for wireless communication. The network node may include a processing system that includes one or more processors and one or more memories coupled with the one or more processors. The processing system may be configured to cause the network node to transmit, to multiple UEs, respective OTA-DPD training signals. The processing system may be configured to cause the network node to receive, from the multiple UEs in accordance with the OTA-DPD training signals, multiple PA model reports. The processing system may be configured to cause the network node to perform a DPD correction procedure for a transmission chain in accordance with the multiple PA model reports.

Some aspects described herein relate to a non-transitory computer-readable medium that stores a set of instructions for wireless communication by UE. The set of instructions, when executed by one or more processors of the UE, may cause the UE to receive a first OTA-DPD training signal. The set of instructions, when executed by one or more processors of the UE, may cause the UE to transmit a first PA model report in accordance with the first OTA-DPD training signal. The set of instructions, when executed by one or more processors of the UE, may cause the UE to receive a second OTA-DPD training signal. The set of instructions, when executed by one or more processors of the UE, may cause the UE to transmit a second PA model report in accordance with the second OTA-DPD training signal.

Some aspects described herein relate to a non-transitory computer-readable medium that stores a set of instructions for wireless communication by a network node. The set of instructions, when executed by one or more processors of the network node, may cause the network node to transmit, to multiple UEs, respective OTA-DPD training signals. The set of instructions, when executed by one or more processors of the network node, may cause the network node to receive, from the multiple UEs in accordance with the OTA-DPD training signals, multiple PA model reports. The set of instructions, when executed by one or more processors of the network node, may cause the network node to perform a DPD correction procedure for a transmission chain in accordance with the multiple PA model reports.

Some aspects described herein relate to an apparatus for wireless communication. The apparatus may include means for receiving a first OTA-DPD training signal. The apparatus may include means for transmitting a first PA model report in accordance with the first OTA-DPD training signal, the first PA model report indicating a set of data bits and a first set of parity bits. The apparatus may include means for receiving a second OTA-DPD training signal. The apparatus may include means for transmitting a second PA model report in accordance with the second OTA-DPD training signal, the second PA model report indicating at least a second set of parity bits that enable information associated with the second PA model report to be decoded using at least the second set of parity bits and the set of data bits.

Some aspects described herein relate to an apparatus for wireless communication. The apparatus may include means for transmitting, to multiple UEs, respective OTA-DPD training signals. The apparatus may include means for receiving, from the multiple UEs in accordance with the OTA-DPD training signals, multiple PA model reports, the multiple PA model reports including at least a first PA model report indicating a set of data bits and a first set of parity bits, and a second PA model report indicating at least a second set of parity bits that enable information associated with the second PA model report to be decoded using at least the second set of parity bits and the set of data bits. The apparatus may include means for performing a DPD correction procedure for a transmission chain in accordance with the multiple PA model reports.

Aspects of the present disclosure may generally be implemented by or as a method, apparatus, system, computer program product, non-transitory computer-readable medium, user equipment, base station, network node, network entity, wireless communication device, or processing system as substantially described with reference to, and as illustrated by, this specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
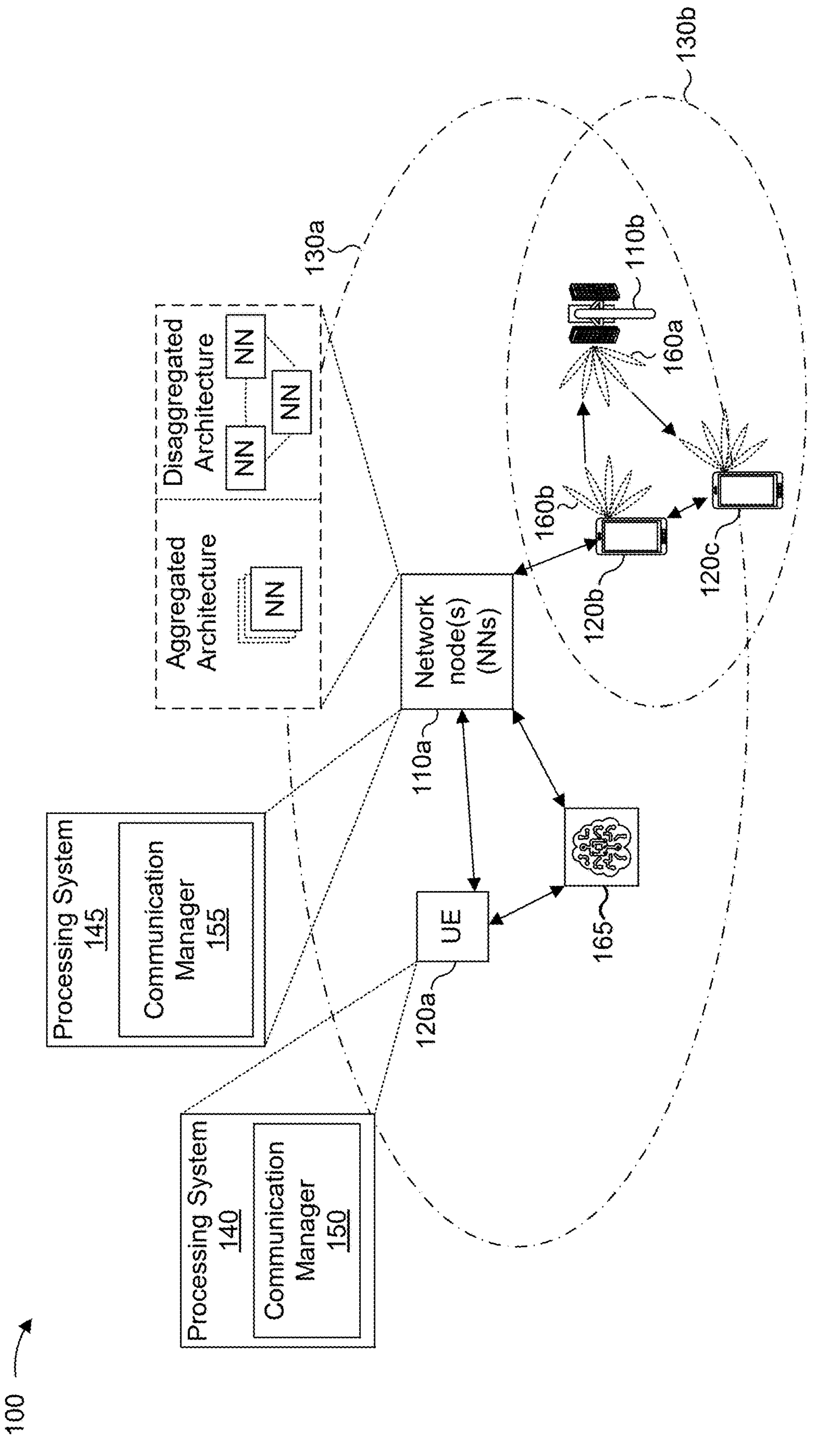
FIG. 1 is a diagram illustrating an example of a wireless communication network.

Various aspects of the present disclosure are described hereinafter with reference to the accompanying drawings. However, aspects of the present disclosure may be embodied in many different forms. The present disclosure is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures or functionalities in addition to or other than the structures or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

In some examples, a network node may communicate with a user equipment (UE). The network node or the UE may be configured to perform an over-the-air digital predistortion (OTA-DPD) training procedure. In an OTA-DPD training procedure, a receiver (e.g., the UE) calculates non-linearity coefficients associated with the transmitter's (e.g., the network node's) power amplifier (PA), and the receiver signals the non-linearity coefficients back to the transmitter. For example, the receiver may receive an OTA-DPD training signal, may compute a PA model report using the OTA-DPD training signal by calculating one or more non-linearity coefficients associated with the transmitter's PA(s), and may transmit the PA model report to the transmitter. Using the PA model report, the transmitter may perform a DPD correction procedure, such as for a purpose of removing a non-linear distortion noise floor for the transmitter's transmission chain. For example, at a next transmission, the transmitter may apply an inverse of the estimated PA model in the transmission chain prior to the PA, based on or otherwise associated with the feedback received from the receiver.

This OTA-DPD procedure may be repeated in order to perform an accurate DPD correction procedure for varying channel conditions, among other examples. Put another way, the network node may schedule periodic or aperiodic OTA-DPD training sessions in order to track changes to the PA model over time. In this way, during every iteration of the OTA-DPD training session, the network node may transmit an OTA-DPD training signal and the UE may calculate the one or more non-linearity coefficients and transmit the PA model report to the network node. In this way, the multiple OTA-DPD training sessions may result in a considerable amount of uplink overhead, resulting in a degraded data rate, among other examples. Moreover, using only one UE to provide feedback (e.g., PA model reports) may result in a poorly estimated PA model and thus distorted signals from the network node in subsequent transmissions, leading to communication errors and thus high computing, power, and network resource consumption for correcting communication errors.

Various aspects relate generally to PA model report signaling between a UE and a network node. Some aspects more specifically relate to signaling of compressed PA model reports from one or more UEs to a network node. In some aspects, a network node may utilize a federated OTA-DPD training procedure associated with receiving OTA-DPD feedback from multiple UEs. More particularly, the network node may transmit, to the multiple UEs, respective OTA-DPD training signals, and may receive, from the multiple UEs in accordance with the OTA-DPD training signals, multiple PA model reports. The network node may thus perform a DPD correction procedure for a transmission chain in accordance with the multiple PA model reports. Additionally or alternatively, in some aspects, one or more UEs may provide OTA-DPD feedback to the network node using a differential scheme (sometimes referred to as a differential coding scheme, a distributed coding scheme, or a distributed scheme). More particularly, the network node may receive, from a UE, a first (e.g., full) PA model report in accordance with a first OTA-DPD training signal and a second (e.g., compressed) PA model report in accordance with a second OTA-DPD training signal. The first PA model report may indicate a set of data bits and a first set of parity bits, and the second PA model report may indicate a second set of parity bits that enable information associated with the second PA model report to be decoded using at least the second set of parity bits and the set of data bits.

Particular aspects of the subject matter described in this disclosure can be implemented to realize one or more of the following potential advantages. In some examples, the federated OTA-DPD procedure (e.g., using feedback from multiple UEs to perform the DPD correction procedure) may improve the DPD correction capabilities of the network node because the network node may benefit from frequent updates of the non-linearity model from the multiple UEs, because the federated OTA-DPD training procedure may improve the estimation accuracy due to the processing gain of the multiple UEs, or because the federated OTA-DPD training procedure may enable aggregation of results from the multiple UEs (such as in aspects in which each UE calculates only a subset of the data). Additionally or alternatively, the differential scheme described above (e.g., transmitting, after a full PA model report, a compressed PA model report that is capable of being decoded using information in the full PA model report) may enable the UEs to use reduced uplink resources for transmitting the PA model reports, thereby resulting in increased bandwidth or data rates, decreased latency, and otherwise more efficient usage of network resources.

As described above, wireless communication systems may be deployed to provide various services, which may involve carrying or supporting voice, text, other messaging, video, data, or other traffic. Some wireless communications systems may employ multiple-access radio access technologies (RATs). The multiple-access RATs may be capable of supporting communication with multiple wireless communication devices by sharing the available system resources (for example, time domain resources, frequency domain resources, spatial domain resources, or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

Multiple-access RATs are supported by technological advancements that have been adopted in various telecommunication standards, which define common protocols that enable wireless communication devices to communicate on a local, municipal, enterprise, national, regional, or global level. For example, 5G New Radio (NR) is part of a continuous mobile broadband evolution promulgated by the Third Generation Partnership Project (3GPP). 5G NR may support enhanced mobile broadband (eMBB) access, Internet of Things (IoT) networks or reduced capability (RedCap) device deployments, ultra-reliable low-latency communication (URLLC) applications, or massive machine-type communication (mMTC), among other examples.

To support these and other target verticals, a wireless communication system may be designed to implement a modularized functional infrastructure, a disaggregated and service-based network architecture, network function virtualization, network slicing, multi-access edge computing, millimeter wave (mmWave) technologies including massive multiple-input multiple-output (MIMO), beamforming, IoT device or RedCap device connectivity and management, industrial connectivity, licensed and unlicensed spectrum access, sidelink and other device-to-device direct communication (for example, cellular vehicle-to-everything (CV2X) communication), frequency spectrum expansion, overlapping spectrum use, small cell deployments, non-terrestrial network (NTN) deployments, device aggregation, advanced duplex communication (for example, sub-band full-duplex (SBFD)), multiple-subscriber implementations, high-precision positioning, radio frequency (RF) sensing, network energy savings (NES), low-power signaling and radios, or artificial intelligence or machine learning (AI/ML), among other examples.

The foregoing and other technological improvements may support use cases, such as wireless fronthauls, wireless midhauls, wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial or aerial platforms, among other examples.

As the demand for connectivity continues to increase, further improvements in NR may be implemented, and other RATs, such as 6G and beyond, may be introduced to enable new applications and facilitate new use cases. The methods, operations, apparatuses, and techniques described herein may enable one or more of the foregoing technologies or new technologies or support one or more of the foregoing use cases or new use cases.

FIG. 1 is a diagram illustrating an example of a wireless communication network 100. The wireless communication network 100 may be or may include elements of a 5G (or NR) network or a 6G network, among other examples. The wireless communication network 100 may include multiple network nodes 110. For example, in FIG. 1, the wireless communication network 100 includes a network node (NN) 110*a* and a network node 10*b*. The network nodes 110 may support communications with multiple UEs 120. For example, in FIG. 1, the network nodes 110 support communication with a UE 120*a*, a UE 120*b*, and a UE 120*c*. In some examples, a UE 120 may also communicate with other UEs 120 and a network node 110 may communicate with a core network and with other network nodes 110.

The network nodes 110 and the UEs 120 of the wireless communication network 100 may communicate using the electromagnetic spectrum, which may be subdivided by frequency or wavelength into various classes, bands, carriers, or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency bands or ranges. In some examples, when multiple RATs are deployed in a given geographic area, each RAT in the geographic area may operate on different frequencies to avoid interference with other RATs. Additionally or alternatively, in some examples, the wireless communication network 100 may implement dynamic spectrum sharing (DSS), in which multiple RATs are implemented with dynamic bandwidth allocation (for example, based on or otherwise associated with user demand) in a single frequency band. In some examples, the wireless communication network 100 may support communication over unlicensed spectrum, where access to an unlicensed channel is subject to a channel access mechanism. For example, in a shared or unlicensed frequency band, a transmitting device may perform a channel access procedure, such as a listen-before-talk (LBT) procedure, to contend against other devices for channel access before transmitting on a shared or unlicensed channel.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into the mid-band frequencies. Thus, "sub-6 GHz," if used herein, may broadly refer to frequencies that are less than 6 GHz, that are within FR1, or that are included in mid-band frequencies. Similarly, the term "millimeter wave," if used herein, may broadly refer to mid-band frequencies or to frequencies that are within FR2, FR4, FR4-a or FR4-1, FR5, or the EHF band. Higher frequency bands may extend 5G NR operation, 6G operation, or other RATs beyond 52.6 GHz.

A network node 110 or a UE 120 may include one or more devices, components, or systems that enable communication with other devices, components, or systems of the wireless communication network 100. For example, a UE 120 and a network node 110 may each include one or more chips, system-on-chips (SoCs), chipsets, packages, or devices that individually or collectively constitute or comprise a processing system, such as a processing system 140 of the UE 120 or a processing system 145 of the network node 110. A processing system (for example, the processing system 140 or the processing system 145) includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASICs), programmable logic devices (PLDs), or other discrete gate or transistor logic or circuitry (any one or more of which may be generally referred to herein individually as a "processor" or collectively as "the processor" or "the processor circuitry"). Such processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set. In some other examples, each of a group of processors may be configurable or configured to perform a same set of functions.

The processing system 140 and the processing system 145 may each include memory circuitry in the form of one or multiple memory devices, memory blocks, memory elements, or other discrete gate or transistor logic or circuitry, each of which may include or implement tangible storage media such as random-access memory (RAM) or read-only memory (ROM), or combinations thereof (any one or more of which may be generally referred to herein individually as a "memory" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code or instructions (such as software) that, when executed by one or more of the processors, may configure one or more of the processors to perform various functions or operations described herein. Additionally or alternatively, in some examples, one or more of the processors may be configured to perform various functions or operations described herein without requiring configuration by software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise.

The processing system 140 and the processing system 145 may each include or be coupled with one or more modems (such as a cellular (for example, a 5G or 6G compliant) modem). In some examples, one or more processors of the processing system 140 or the processing system 145 include or implement one or more of the modems. The processing system 140 and the processing system 145 may also include or be coupled with multiple radios (collectively "the radio"), multiple RF chains, or multiple transceivers, each of which may in turn be coupled with one or more of multiple antennas. In some examples, one or more processors of the processing system 140 or the processing system 145 include or implement one or more of the radios, RF chains, or transceivers. An RF chain may include one or more filters, mixers, oscillators, amplifiers, analog-to-digital converters (ADCs), or other devices that convert between an analog signal (such as for transmission or reception via an air interface) and a digital signal (such as for processing by the processing system 140 of the UE 120 or by the processing system 145 of the network node 110).

A network node 110 and a UE 120 may each include one or multiple antennas or antenna arrays. Typical network nodes 110 and UEs 120 may include multiple antennas, which may be organized or structured into one or more antenna panels, one or more antenna groups, one or more sets of antenna elements, or one or more antenna arrays, among other examples. As used herein, the term "antenna" can refer to one or more antennas, one or more antenna panels, one or more antenna groups, one or more sets of antenna elements, or one or more antenna arrays. The term "antenna panel" can refer to a group of antennas (such as antenna elements) arranged in an array or panel, which may facilitate beamforming by manipulating parameters associated with the group of antennas. The term "antenna module" may refer to circuitry including one or more antennas as well as one or more other components (such as filters, amplifiers, or processors) associated with integrating the antenna module into a wireless communication device such as the network node 110 and the UE 120.

A network node 110 may be, may include, or may also be referred to as an NR network node, a 5G network node, a 6G network node, a Node B, a gNB, an access point (AP), a transmission reception point (TRP), a network entity, a network element, a network equipment, or another type of device, component, or system included in a radio access network (RAN). In various deployments, a network node 110 may be implemented as a single physical node (for example, a single physical structure) or may be implemented as two or more physical nodes (for example, two or more distinct physical structures). For example, a network node 110 may be a device or system that implements a part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node having an aggregated architecture, meaning that the network node 110 may implement a full radio protocol stack that is physically and logically integrated within a single physical structure in the wireless communication network 100. For example, an aggregated network node 110 may consist of a single standalone base station or a single TRP that operates with a full radio protocol stack to enable or facilitate communication between a UE 120 and a core network of the wireless communication network 100.

Alternatively, and as also shown, a network node 110 may be a disaggregated network node (sometimes referred to as a disaggregated base station), having a disaggregated architecture, meaning that the network node 110 may operate with a radio protocol stack that is physically distributed or logically distributed among two or more nodes in the same geographic location or in different geographic locations. An example disaggregated network node architecture is described in more detail below with reference to FIG. 2. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating network functionality into multiple units or modules that can be individually deployed.

The network nodes 110 of the wireless communication network 100 may include one or more central units (CUs), one or more distributed units (DUs), and one or more radio units (RUs). A CU may host one or more higher layers, such as a radio resource control (RRC) layer, a packet data convergence protocol (PDCP) layer, and a service data adaptation protocol (SDAP) layer, among other examples. A DU may host one or more of a radio link control (RLC) layer, a medium access control (MAC) layer, or one or more higher physical (PHY) layers depending, at least in part, on a functional split, such as a functional split defined by the 3GPP. In some examples, a DU also may host a lower PHY layer that is configured to perform functions, such as a fast Fourier transform (FFT), an inverse FFT (IFFT), beamforming, or physical random access channel (PRACH) extraction and filtering, among other examples. An RU may perform RF processing functions or lower PHY layer functions, such as an FFT, an IFFT, beamforming, or PRACH extraction and filtering, among other examples, in accordance with a functional split, such as a lower layer split (LLS). In such an architecture, each RU can be operated to handle over the air (OTA) communication with one or more UEs 120. In some examples, a single network node 110 may include a combination of one or more CUs, one or more DUs, or one or more RUs. In some examples, a CU, a DU, or an RU may be implemented as a virtual unit, such as a virtual central unit (VCU), a virtual distributed unit (VDU), or a virtual radio unit (VRU), among other examples, which may be implemented as a virtual network function, such as in a cloud deployment.

Some network nodes 110 (for example, a base station, an RU, or a TRP) may provide communication coverage for a particular geographic area. The term "cell" can refer to a coverage area of a network node 110 or to a network node 110 itself, depending on the context in which the term is used. A network node 110 may support one or more cells (for example, each cell may support communication within an angular (for example, 60 degree) range around the network node). In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with associated service subscriptions. A pico cell may cover a relatively small geographic area and may also allow unrestricted access by UEs 120 with associated service subscriptions. A femto cell may cover a relatively small geographic area (for example, a home) and may allow restricted access by UEs 120 having association with the femto cell (for example, UEs 120 in a closed subscriber group (CSG)). In some examples, a cell may not necessarily be stationary. For example, the geographic area of the cell may move in accordance with the location of an associated mobile network node 110 (for example, a train, a satellite, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, or disaggregated network nodes, among other examples. Various different types of network nodes 110 may generally transmit at different power levels, serve different coverage areas (for example, a cell 130*a* and a cell 130*b*), or have different impacts on interference in the wireless communication network 100 than other types of network nodes 110.

The UEs 120 may be physically dispersed throughout the coverage area of the wireless communication network 100, and each UE 120 may be stationary or mobile. A UE 120 may be, may include, or may also be referred to as an access terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a netbook, a smartbook, an ultrabook, a medical device, a biometric device, a wearable device (for example, a smart watch, smart clothing, smart glasses, a smart wristband, or smart jewelry), a gaming device, an entertainment device (for example, a music device, a video device, or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, or any other suitable device or function that may communicate via a wireless medium.

Some UEs 120 may be classified in accordance with different categories in association with different complexities or different capabilities. UEs 120 in a first category may facilitate massive IoT in the wireless communication network 100, and may offer low complexity or cost relative to UEs 120 in a second category. UEs 120 in a second category may include mission-critical IoT devices, legacy UEs, baseline UEs, high-tier UEs, advanced UEs, full-capability UEs, or premium UEs that are capable of URLLC, eMBB, or precise positioning in the wireless communication network 100, among other examples. A third category of UEs 120 may have mid-tier complexity or capability (for example, a capability between that of the UEs 120 of the first category and that of the UEs 120 of the second capability). A UE 120 of the third category may be referred to as a reduced capability UE ("RedCap UE"), a mid-tier UE, an NR-Light UE, or an NR-Lite UE, among other examples. RedCap UEs may bridge a gap between the capability and complexity of NB-IoT devices or eMTC UEs, and mission-critical IoT devices or premium UEs. RedCap UEs may include, for example, wearable devices, IoT devices, industrial sensors, or cameras that are associated with a limited bandwidth, power capacity, or transmission range, among other examples. RedCap UEs may support healthcare environments, building automation, electrical distribution, process automation, transport and logistics, or smart city deployments, among other examples.

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink and uplink resources may include time domain resources (for example, frames, subframes, slots, and symbols), frequency domain resources (for example, frequency bands, component carriers (CCs), subcarriers, resource blocks, and resource elements), and spatial domain resources (for example, particular transmit directions or beams).

Frequency domain resources may be subdivided into bandwidth parts (BWPs). A BWP may be a block of frequency domain resources (for example, a continuous set of resource blocks (RBs) within a full component carrier bandwidth) that may be configured at a UE-specific level. A UE 120 may be configured with both an uplink BWP and a downlink BWP (which may be the same or different). Each BWP may be associated with its own numerology (indicating a sub-carrier spacing (SCS) and cyclic prefix (CP)). A BWP may be dynamically configured or activated (for example, by a network node 110 transmitting a downlink control information (DCI) configuration to the one or more UEs 120) or reconfigured (for example, in real-time or near-real-time) in accordance with changing network conditions in the wireless communication network 100 or specific requirements of one or more UEs 120. An active BWP defines the operating bandwidth of the UE 120 within the operating bandwidth of the serving cell. The use of BWPs enables more efficient use of the available frequency domain resources in the wireless communication network 100 because fewer frequency domain resources may be allocated to a BWP for a UE 120 (which may reduce the quantity of frequency domain resources that a UE 120 is required to monitor and reduce UE power consumption by enabling the UE to monitor fewer frequency domain resources), leaving more frequency domain resources to be spread across multiple UEs 120. Thus, BWPs may also assist in the implementation of lower-capability (for example, RedCap) UEs 120 by facilitating the configuration of smaller bandwidths for communication by such UEs 120 or by facilitating reduced UE power consumption.

As used herein, a downlink signal may be or include a reference signal, control information, or data. For example, downlink reference signals include a primary synchronization signal (PSS), a secondary SS (SSS), an SS block (SSB) (for example, that includes a PSS, an SSS, and a physical broadcast channel (PBCH)), a demodulation reference signal (DMRS), a phase tracking reference signal (PTRS), a tracking reference signal (TRS), and a channel state information (CSI) reference signal (CSI-RS), among other examples. A downlink signal carrying control information or data may be transmitted via a downlink channel. Downlink channels may include one or more control channels for transmitting control information and one or more data channels for transmitting data. Downlink reference signals may be transmitted in addition to, or multiplexed with, downlink control channel communications or downlink data channel communications. A downlink control channel may be specifically used to transmit DCI from a network node 110 to a UE 120. DCI generally contains the information the UE 120 needs to identify RBs in a subsequent subframe and how to decode them, including a modulation and coding scheme (MCS) or redundancy version parameters. Different DCI formats carry different information, such as scheduling information in the form of downlink or uplink grants, slot formal indicators (SFIs), preemption indicators (PIs), transmit power control (TPC) commands, hybrid automatic repeat request (HARQ) information, new data indicators (NDIs), among other examples. A downlink data channel may be used to transmit downlink data (for example, user data associated with a UE 120) from a network node 110 to a UE 120. Downlink control channels may include physical downlink control channels (PDCCHs), and downlink data channels may include physical downlink shared channels (PDSCHs). Control information or data communications may be transmitted on a PDCCH and PDSCH, respectively. For example, a PDCCH can carry DCI, while a PDSCH can carry a MAC control element (MAC-CE), an RRC message, or user data, among other examples. Each PDSCH may carry one or more transport blocks (TBs) of data.

As used herein, an uplink signal may include a reference signal, control information, or data. For example, uplink reference signals include a sounding reference signal (SRS), a PTRS, and a DMRS, among other examples. An uplink signal carrying control information or data may be transmitted via an uplink channel. An uplink channel may include one or more control channels for transmitting control information and one or more data channels for transmitting data. Uplink reference signals may be transmitted in addition to, or multiplexed with, uplink control channel communications or uplink data channel communications. An uplink control channel may be specifically used to transmit uplink control information (UCI) from a UE 120 to a network node 110. An uplink data channel may be used to transmit uplink data (for example, user data associated with a UE 120) from a UE 120 to a network node 110. Uplink control channels may include physical uplink control channels (PUCCHs), and uplink data channels may include physical uplink shared channels (PUSCHs). Control information or data communications may be transmitted on a PUCCH and PUSCH, respectively. For example, a PUCCH can carry UCI, while a PUSCH can carry a MAC-CE, an RRC message, or user data, among other examples. UCI can include a scheduling request (SR), HARQ feedback information (for example, a HARQ acknowledgement (ACK) indication or a HARQ negative acknowledgement (NACK) indication), uplink power control information (for example, an uplink TPC parameter), or CSI, among other examples. CSI can include a channel quality indicator (CQI) (indicative of downlink channel conditions to facilitate selection of transmission parameters, such as an MCS, by a network node 110), a precoding matrix indicator (PMI), a CSI-RS resource indicator (CRI) (for example, indicative of a beam used to transmit a CSI-RS), an SS/PBCH resource block indicator (SSBRI) (for example, indicative of a beam used to transmit an SSB), a layer indicator (LI), a rank indicator (RI), or measurement information (for example, a layer 1 (L1)-reference signal received power (RSRP) parameter, a received signal strength indicator (RSSI) parameter, a reference signal received quality (RSRQ) parameter, among other examples) which can be used for beam management, among other examples. Each PUSCH may carry one or more TBs of data.

The information (for example, data, control information, or reference signal information) transmitted by a network node 110 to a UE 120, or vice versa, may be represented as a sequence of binary bits that are mapped (for example, modulated) to an analog signal waveform (for example, a discrete Fourier transform (DFT)-spread-orthogonal frequency division multiplexing (OFDM) (DFT-s-OFDM) waveform or a CP-OFDM waveform) that is transmitted by the network node 110 or UE 120 over a wireless communication channel. In some examples, the network node 110 or the UE 120 (for example, using the processing system 145 or the processing system 140, respectively) may select an MCS (for example, an order of quadrature amplitude modulation (QAM), such as 64-QAM, 128-QAM, or 256-QAM, among other examples) for a downlink signal or an uplink signal. For example, the network node 110 may select an MCS for a downlink signal in accordance with UCI received from the UE 120. The network node 110 may transmit, to the UE 120, an indication of the selected MCS for the downlink signal, such as via DCI that schedules the downlink signal. As another example, the network node 110 may transmit, and the UE 120 may receive, an indication of an MCS to be applied for the one or more uplink signals, such as via DCI scheduling transmission of the one or more uplink signals.

The network node 110 or the UE 120 (such as by using the processing system 145 or the processing system 140, respectively, or one or more coupled modems) may perform signal processing on the information (such as filtering, amplification, modulation, digital-to-analog conversion, an IFFT operation, multiplexing, interleaving, mapping, or encoding, among other examples) to generate a processed signal in accordance with the selected MCS. In some examples, the network node 110 or the UE 120 (for example, using the processing system 145 or the processing system 140, respectively, or one or more coupled encoders or modems) may perform a channel coding operation or a forward error correction (FEC) operation to control errors in transmitted information. For example, the network node 110 or the UE 120 may perform an encoding operation to generate encoded information (such as by selectively introducing redundancy into the information, typically using an error correction code (ECC), such as a polar code or a low-density parity-check (LDPC) code). The network node 110 or the UE 120 (for example, using the processing system 145 or one or more modems) may further perform spatial processing (for example, precoding) on the encoded information to generate one or more processed or precoded signals for downlink or uplink transmission, respectively. In some examples, the network node 110 or the UE 120 may perform codebook-based precoding or non-codebook-based precoding. Codebook-based precoding may involve selecting a precoder (for example, a precoding matrix) using a codebook. For example, the network node 110 may provide precoding information indicating which precoder, defined by the codebook, is to be used by the UE 120. Non-codebook-based precoding may involve selecting or deriving a precoder based on, or otherwise associated with, one or more downlink or uplink signal measurements. The network node 110 or the UE 120 may transmit the processed downlink or uplink signals, respectively, via one or more antennas.

The network node 110 or the UE 120 may receive uplink signals or downlink signals, respectively, via one or more antennas. The network node 110 or the UE 120 (for example, using the processing system 145 or the processing system 140, respectively, or one or more coupled modems) may perform signal processing (for example, in accordance with the MCS) on the received uplink or downlink signals, respectively (such as filtering, amplification, demodulation, analog-to-digital conversion, an FFT operation, demultiplexing, deinterleaving, de-mapping, equalization, interference cancellation, or decoding, among other examples), to map the received signal(s) to a sequence of binary bits (for example, received information) that estimates the information transmitted by the network node 110 or the UE 120 via the downlink or uplink signals. The network node 110 or the UE 120 (for example, using the processing system 145 or the processing system 140, respectively, or a coupled decoder or one or more modems) may decode the received information (such as by using an ECC, a decoding operation, or an FEC operation) to detect errors or correct bit errors in the received information to generate decoded information. The decoded information may estimate the information transmitted via the downlink or uplink signals.

In some examples, a UE 120 and a network node 110 may perform MIMO communication. "MIMO" generally refers to transmitting or receiving multiple signals (such as multiple layers or multiple data streams) simultaneously over the same time and frequency resources. MIMO techniques generally exploit multipath propagation. A network node 110 or UE 120 may communicate using massive MIMO, multi-user MIMO, or single-user MIMO, which may involve rapid switching between beams or cells. For example, the amplitudes or phases of signals transmitted via antenna elements or sub-elements may be modulated and shifted relative to each other (such as by manipulating a phase shift, a phase offset, or an amplitude) to generate one or more beams, which is referred to as beamforming. For example, the network node 110*b* may generate one or more beams 160*a*, and the UE 120*b* may generate one or more beams 160*b*. The term "beam" may refer to a directional transmission of a wireless signal toward a receiving device or otherwise in a desired direction, a directional reception of a wireless signal from a transmitting device or otherwise in a desired direction, a direction associated with a directional transmission or directional reception, a set of directional resources associated with a signal transmission or signal reception (for example, an angle of arrival, a horizontal direction, or a vertical direction), a set of parameters that indicate one or more aspects of a directional signal, a direction associated with the signal, or a set of directional resources associated with the signal, among other examples.

MIMO may be implemented using various spatial processing or spatial multiplexing operations. In some examples, MIMO may include a massive MIMO technique which may be associated with an increased (for example, "massive") quantity of antennas at the network node 110 or at the UE 120, such as in a network implementing mmWave technology. Massive MIMO may improve communication reliability by enabling a network node 110 or a UE 120 to communicate the same data across different propagation (or spatial) paths. In some examples, MIMO may support simultaneous transmission to multiple receivers, referred to as multi-user MIMO (MU-MIMO). Some RATs may employ MIMO techniques, such as multi-TRP (mTRP) operation (including redundant transmission or reception on multiple TRPs), reciprocity in the time domain or the frequency domain, single-frequency-network (SFN) transmission, or non-coherent joint transmission (NC-JT).

To support MIMO techniques, the network node 110 and the UE 120 may perform one or more beam management operations, such as an initial beam acquisition operation, one or more beam refinement operations, or a beam recovery operation. For example, an initial beam acquisition operation may involve the network node 110 transmitting signals (for example, SSBs, CSI-RSs, or other signals) via respective beams (for example, of the beams 160*a* of the network node 110) and the UE 120 receiving and measuring the signal(s) via respective beams of multiple beams (for example, from the beams 160*b* of the UE 120) to identify a best beam (or beam pair) for communication between the UE 120 and the network node 110. For example, the UE 120 may transmit an indication (for example, in a message associated with a random access channel (RACH) operation) of a (best) identified beam of the network node 110 (for example, by indicating an SSBRI or other identifier associated with the beam). A beam refinement operation may involve a first device (for example, the UE 120 or the network node 110) transmitting signal(s) via a subset of beams (for example, identified based on, or otherwise associated with, measurements reported as part of one or more other beam management operations). A second device (for example, the network node 110 or the UE 120) may receive the signal(s) via a single beam (for example, to identify the best beam for communication from the subset of beams). The beam(s) may be identified via one or more spatial parameters, such as a transmission configuration indicator (TCI) state or a quasi co-location (QCL) parameter, among other examples. The network node 110 and the UE 120 may increase reliability or achieve efficiencies in throughput, signal strength, or other signal properties for massive MIMO operations by performing the beam management operations.

Some aspects and techniques as described herein may be implemented, at least in part, using an artificial intelligence (AI) program (for example, referred to herein as an "AI/ML model"), such as a program that includes a machine learning (ML) model or an artificial neural network (ANN) model. The AI/ML model may be deployed at one or more devices 165 (for example, one or more network nodes 110, one or more UEs 120, or one or more servers, or one or more components of a cloud computing network, among other examples). For example, in an deployment where AI/ML functionality is performed independently at a device 165, sometimes referred to as "overlay AI/ML", the AI/ML model (or an instance or portion of the AI/ML model) may be deployed at a UE 120 (for example, at the processing system 140), a network node 110 (for example, at the processing system 145), one or more servers, or one or more components of a cloud computing network, among other examples. Additionally or alternatively, in a deployment where AI/ML functionality is coordinated between different devices 165, sometimes referred to as "coordinated AI/ML", or performed at all device and network layers, sometimes referred to as "native AI/ML", the AI/ML model (or an instance of the AI/ML model) may be deployed at multiple devices 165 (for example, a first portion of the AI/ML model may be deployed at a UE 120 and a second portion of the AI/ML model may be deployed at a network node 110). In other examples of coordinated AI/ML or native AI/ML, a first AI/ML model may be deployed at a UE 120 and a second AI/ML model may be deployed at a network node 110. The AI/ML model(s) may be configured to enhance various aspects of the wireless communication network 100 (for example, to increase privacy, reliability, or efficient use of network bandwidth, or to reduce latency, among other examples). For example, the AI/ML model(s) may be trained to identify patterns or relationships in data corresponding to the wireless communication network 100, a device, or an air interface, among other examples. The AI/ML model(s) may support operational decisions relating to one or more aspects associated with wireless communications devices, networks, or services.

Accordingly, in some examples, the AI/ML model(s) may enable AI-as-a-Service (for example, an end-to-end AI/ML service via a user plane) for use cases such as a self-organizing network (SON), minimization of drive test (MDT), quality of experience (QoE), positioning, sensing, predictive mobility, or traffic prediction, among other examples. In some examples, AI-as-a-Service use cases may include measurement collection reporting by a UE 120, device selection criteria (for example, in accordance with a geographical area where measurements are to be collected or UE capabilities to be used to collected measurements), or reporting configurations (for example, reporting parameters such as location, time, or sensor information, among other examples). Additionally or alternatively, the AI/ML model(s) may enable AI/ML procedures (for example, RAN-triggered service establishment, configuration, inferencing using UE-side or network-side models, performance monitoring or management, or capability signaling, among other examples). Additionally or alternatively, the AI/ML model(s) may enable RAN-based AI/ML services via one or more application program interfaces (APIs) or management interfaces for use cases such as beam management, radio resource monitoring (RRM) relaxation, mobility prediction, load prediction, network energy savings, or coverage and capacity improvements, among other examples).

In some aspects, the UE 120 may include a communication manager 150. As described in more detail elsewhere herein, the communication manager 150 may receive a first OTA-DPD training signal; transmit a first PA model report in accordance with the first OTA-DPD training signal, the first PA model report indicating a set of data bits and a first set of parity bits; receive a second OTA-DPD training signal; and transmit a second PA model report in accordance with the second OTA-DPD training signal, the second PA model report indicating at least a second set of parity bits that enable information associated with the second PA model report to be decoded using at least the second set of parity bits and the set of data bits. Additionally or alternatively, the communication manager 150 may perform one or more other operations described herein.

In some aspects, the network node 110 may include a communication manager 155. As described in more detail elsewhere herein, the communication manager 155 may transmit, to multiple UEs, respective OTA-DPD training signals; receive, from the multiple UEs in accordance with the OTA-DPD training signals, multiple PA model reports, the multiple PA model reports including at least a first PA model report indicating a set of data bits and a first set of parity bits, and a second PA model report indicating at least a second set of parity bits that enable information associated with the second PA model report to be decoded using at least the second set of parity bits and the set of data bits; and perform a DPD correction procedure for a transmission chain in accordance with the multiple PA model reports. Additionally or alternatively, the communication manager 155 may perform one or more other operations described herein.

Figure 2:
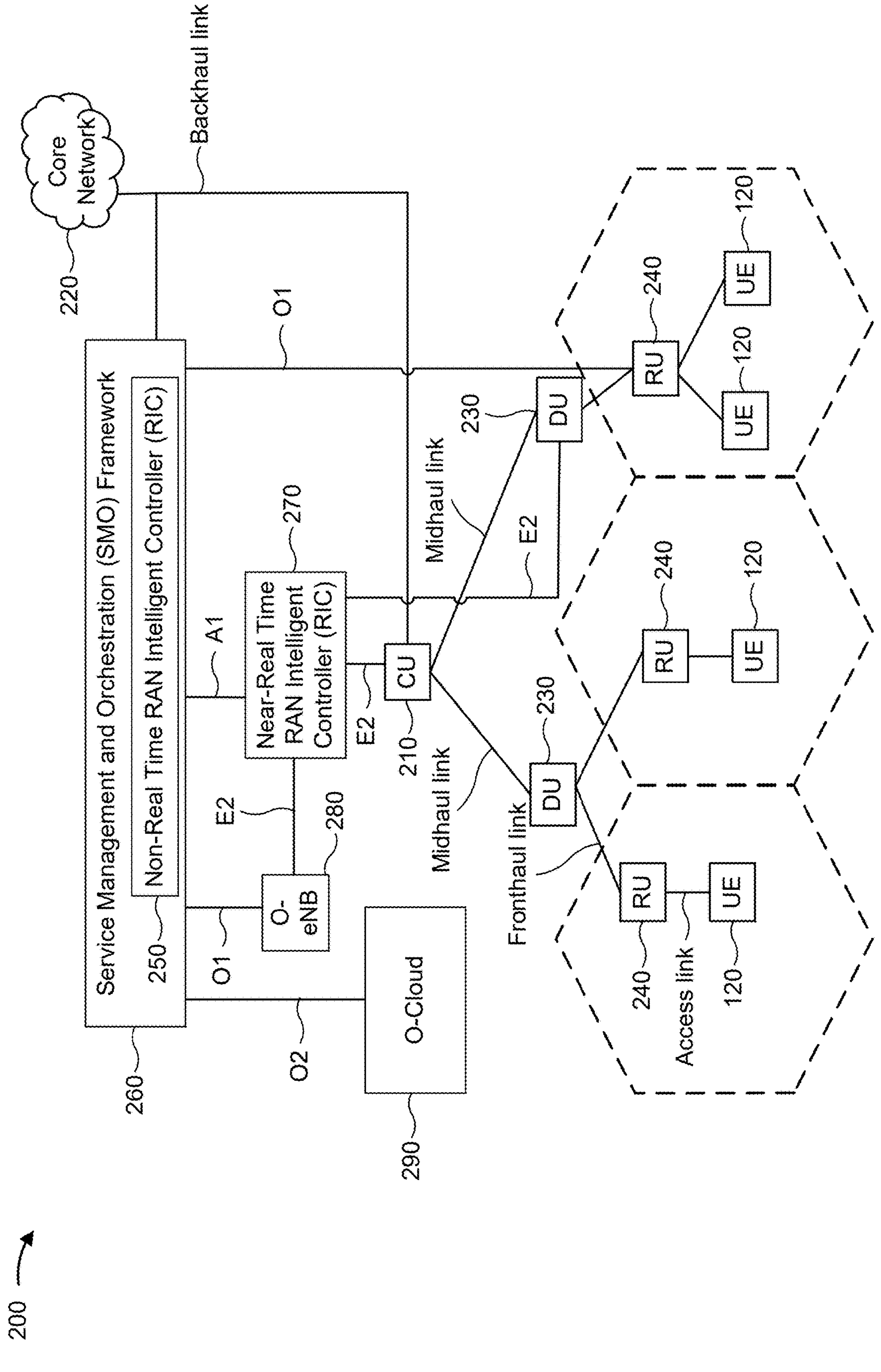
FIG. 2 is a diagram illustrating an example disaggregated network node architecture.

FIG. 2 is a diagram illustrating an example disaggregated network node architecture 200. One or more components of the example disaggregated network node architecture 200 may be, may include, or may be included in one or more network nodes (such one or more network nodes 110). The disaggregated network node architecture 200 may include a CU 210 that can communicate directly with a core network 220 via a backhaul link, or that can communicate indirectly with the core network 220 via one or more disaggregated control units, such as a non-real-time (Non-RT) RAN intelligent controller (RIC) 250 associated with a Service Management and Orchestration (SMO) Framework 260 or a near-real-time (Near-RT) RIC 270 (for example, via an E2 link). The CU 210 may communicate with one or more DUs 230 via respective midhaul links, such as via F1 interfaces. Each of the DUs 230 may communicate with one or more RUs 240 via respective fronthaul links. Each of the RUs 240 may communicate with one or more UEs 120 via respective RF access links. In some deployments, a UE 120 may be simultaneously served by multiple RUs 240.

Each of the components of the disaggregated network node architecture 200, including the CUs 210, the DUs 230, the RUs 240, the Near-RT RICs 270, the Non-RT RICs 250, and the SMO Framework 260, may include one or more interfaces or may be coupled with one or more interfaces for receiving or transmitting signals, such as data or information, via a wired or wireless transmission medium.

In some aspects, the CU 210 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 210 may be deployed to communicate with one or more DUs 230, as necessary, for network control and signaling. Each DU 230 may correspond to a logical unit that includes one or more base station functions to control the operation of one or more RUs 240. For example, a DU 230 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 230, or for communicating signals with the control functions hosted by the CU 210. Each RU 240 may implement lower layer functionality. In some aspects, real-time and non-real-time aspects of control and user plane communication with the RU(s) 240 may be controlled by the corresponding DU 230.

The SMO Framework 260 may support RAN deployment and provisioning of non-virtualized and virtualized network elements. For non-virtualized network elements, the SMO Framework 260 may support the deployment of dedicated physical resources for RAN coverage requirements, which may be managed via an operations and maintenance interface, such as an O1 interface. For virtualized network elements, the SMO Framework 260 may interact with a cloud computing platform (such as an open cloud (O-Cloud) platform 290) to perform network element life cycle management (such as to instantiate virtualized network elements) via a cloud computing platform interface, such as an O2 interface. A virtualized network element may include, but is not limited to, a CU 210, a DU 230, an RU 240, a non-RT RIC 250, or a Near-RT RIC 270. In some aspects, the SMO Framework 260 may communicate with a hardware aspect of a 4G RAN, a 5G NR RAN, or a 6G RAN, such as an open eNB (O-eNB) 280, via an O1 interface. Additionally or alternatively, the SMO Framework 260 may communicate directly with each of one or more RUs 240 via a respective O1 interface. In some deployments, this configuration can enable each DU 230 and the CU 210 to be implemented in a cloud-based RAN architecture, such as a vRAN architecture.

The Non-RT RIC 250 may include or may implement a logical function that enables non-real-time control and optimization of RAN elements and resources, AI/ML workflows including model training and updates, or policy-based guidance of applications or features in the Near-RT RIC 270. The Non-RT RIC 250 may be coupled to or may communicate with (such as via an A1 interface) the Near-RT RIC 270. The Near-RT RIC 270 may include or may implement a logical function that enables near-real-time control and optimization of RAN elements and resources via data collection and actions via an interface (such as via an E2 interface) connecting one or more CUs 210, one or more DUs 230, or an O-eNB 280 with the Near-RT RIC 270.

In some aspects, to generate AI/ML models to be deployed in the Near-RT RIC 270, the Non-RT RIC 250 may receive parameters or external enrichment information from external servers. Such information may be utilized by the Near-RT RIC 270 and may be received at the SMO Framework 260 or the Non-RT RIC 250 from non-network data sources or from network functions. In some examples, the Non-RT RIC 250 or the Near-RT RIC 270 may tune RAN behavior or performance. For example, the Non-RT RIC 250 may monitor long-term trends and patterns for performance and may employ AI/ML models to perform corrective actions via the SMO Framework 260 (such as reconfiguration via an O1 interface) or via creation of RAN management policies (such as A1 interface policies).

The network node 110, the processing system 145 of the network node 110, the UE 120, the processing system 140 of the UE 120, the CU 210, the DU 230, the RU 240, or any other component(s) of FIG. 1 or FIG. 2 may implement one or more techniques or perform one or more operations associated with compressed PA model reports for OTA-DPD training, as described in more detail elsewhere herein. For example, the processing system 145 of the network node 110, the processing system 140 of the UE 120, the CU 210, the DU 230, or the RU 240 may perform or direct operations of, for example, process 600 of FIG. 6, process 700 of FIG. 7, or other processes as described herein (alone or in conjunction with one or more other processors). Memory of the network node 110 may store data and program code (or instructions) for the network node 110, the CU 210, the DU 230, or the RU 240. In some examples, the memory of the network node 110 may store data relating to a UE 120, such as RRC state information or a UE context. Memory of a UE 120 may store data and program code (or instructions) for the UE 120, such as context information. In some examples, the memory of the UE 120 or the memory of the network node 110 may include a non-transitory computer-readable medium storing a set of instructions for wireless communication. For example, the set of instructions, when executed by one or more processors (for example, of the processing system 145 or the processing system 140) of the network node 110, the UE 120, the CU 210, the DU 230, or the RU 240, may cause the one or more processors to perform process 600 of FIG. 6, process 700 of FIG. 7, or other processes as described herein. In some examples, executing instructions may include running the instructions, converting the instructions, compiling the instructions, or interpreting the instructions, among other examples.

In some aspects, the UE 120 includes means for receiving a first OTA-DPD training signal; means for transmitting a first PA model report in accordance with the first OTA-DPD training signal, the first PA model report indicating a set of data bits and a first set of parity bits; means for receiving a second OTA-DPD training signal; or means for transmitting a second PA model report in accordance with the second OTA-DPD training signal, the second PA model report indicating at least a second set of parity bits that enable information associated with the second PA model report to be decoded using at least the second set of parity bits and the set of data bits. The means for the UE 120 to perform operations described herein may include, for example, one or more of communication manager 150, processing system 140, a radio, one or more RF chains, one or more transceivers, one or more antennas, one or more modems, a reception component (for example, reception component 802 depicted and described in connection with FIG. 8), or a transmission component (for example, transmission component 804 depicted and described in connection with FIG. 8), among other examples.

In some aspects, the network node 110 includes means for transmitting, to multiple UEs, respective OTA-DPD training signals; means for receiving, from the multiple UEs in accordance with the OTA-DPD training signals, multiple PA model reports, the multiple PA model reports including at least a first PA model report indicating a set of data bits and a first set of parity bits, and a second PA model report indicating at least a second set of parity bits that enable information associated with the second PA model report to be decoded using at least the second set of parity bits and the set of data bits; or means for performing a DPD correction procedure for a transmission chain in accordance with the multiple PA model reports. The means for the network node 110 to perform operations described herein may include, for example, one or more of communication manager 155, processing system 145, a radio, one or more RF chains, one or more transceivers, one or more antennas, one or more modems, a reception component (for example, reception component 902 depicted and described in connection with FIG. 9), or a transmission component (for example, transmission component 904 depicted and described in connection with FIG. 9), among other examples.

Figure 3:
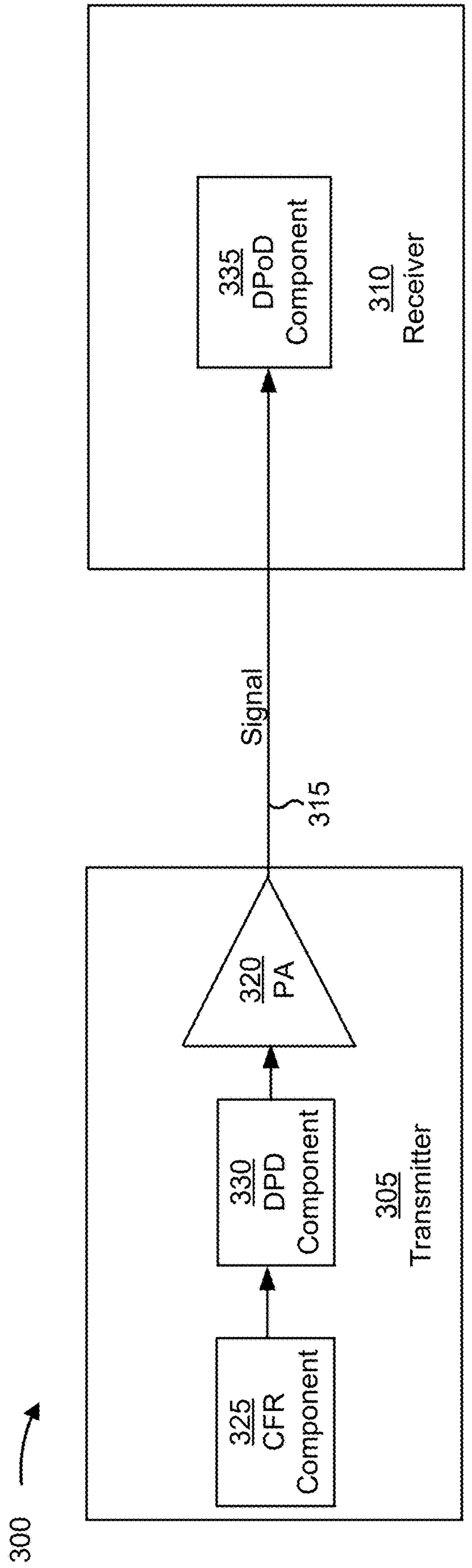
FIG. 3 is a diagram illustrating an example of components for pre-processing and post-processing a signal.

FIG. 3 is a diagram illustrating an example 300 of components for pre-processing and post-processing a signal. As shown in FIG. 3, a transmitter 305 may be in communication with a receiver 310. The transmitter 305 and the receiver 310 may be any of the wireless communication devices described herein (e.g., a UE 120, a network node 110, a CU 210, a DU 230, an RU 240, or the like), or may be located at any of the wireless communication devices described herein.

As shown, the transmitter 305 may communicate with the receiver 310, and, more particularly, the transmitter 305 may send a signal 315 to the receiver 310. The signal 315 may be pre-processed by the transmitter 305 to compress a peak to average power ratio (PAPR) associated with the signal in order to reduce a power-back off value associated with transmission of the signal 315 to the receiver 310, among other reasons.

More particularly, in some communications systems, the transmitter 305 may include non-linear components, such as a PA 320 with a limited dynamic range that may distort a transmitted signal as a result of a relatively high PAPR. The non-linear distortion may be an in-band distortion, which affects link performance in connection with mutual information or an error vector magnitude (EVM) amount, or an out-band distortion, which causes adjacent channel interference (ACI) or results in a high adjacent channel leakage ratio (ACLR) (e.g., the transmitted signal interferes with other signals on neighboring frequency bands, with the ACI or ACLR indicating how much the adjacent channel is polluted by a main transmission). To avoid non-linear distortions and accompanying interference, the transmitter 305 may apply a power back-off value to reduce transmit power, thereby reducing non-linearity.

However, applying a power back-off value may result in reduced power efficiency (e.g., less available transmit power is used to transmit in a channel, thereby reducing range, a signal to interference plus noise ratio (SINR), or the like). Put another way, less power from the transmitter 305 is transmitted to the channel, with more power dissipated as heat, resulting in reduced power efficiency. Accordingly, the transmitter 305 may use one or more pre-processing techniques to reduce the power back-off value (e.g., to transmit close to a PA compression point). For example, the transmitter may utilize crest factor reduction (CFR) processing or DPD processing to reduce distortion. CFR processing may reduce the dynamic range of the signal, while DPD processing may reduce non-linear distortion to less than a threshold level with a reduced level of power back-off, thereby increasing power efficiency relative to avoiding non-linear distortion using only a power back-off. As shown in FIG. 3, the transmitter 305 may thus include a CFR component 325 for performing CFR processing to the signal 315 (e.g., to reduce PAPR in the signal 315 as much as possible and thus reduce the power back-off value), or the transmitter 305 may include a DPD component 330 for performing DPD processing to the signal 315 (e.g., to linearize the PA 320's response).

Additionally or alternatively, the receiver 310 may apply digital post distortion (DPoD) processing to the signal 315. DPoD is a technique to allow the transmitter 305 to transmit close to the PA compression point by reconstructing, on the receiver 310 side, transmitter 305 non-linearities and subtracting the transmitter non-linearities from the received signal in an iterative manner. In that regard, DPoD processing may be similar to DPD processing but is performed in the receiver 310 rather than in the transmitter 305, and may be directed to processing for only EVM instead of processing for both EVM and AC. More particularly, DPoD processing may be performed by a DPoD component 335 at the receiver 310, which may include hardware or software configured to implement an algorithm configured to remove non-linear noise that is generated by a known model. DPoD processing thus may allow for reduced power back-off values and greater power efficiency (e.g., measured in bits per Joules) by enabling the transmitter 305 to transmit at a higher power and thus improve the SINR or capacity.

In some examples, use of the DPD component 330 (e.g., performing a DPD correction) results in removing a non-linear distortion noise floor or enabling higher attainable SINRs. This may result in the transmitter 305 being capable of higher order modulation schemes, such as super-QAM (e.g., 4 k-QAM or even 16 k-QAM), among other examples. However, DPD processing may, in some examples, require coupling the transmission output to a reception feedback chain to capture the non-linearity associated with the signal 315 or to estimate the non-linearity associated with the signal 315. While this may be effective for a small quantity of transmission antennas, coupling the transmission output to a reception feedback chain may not be well-suited for mmWave or similar transmissions, because a transmitter 305 may be associated with a massive transmit antenna array (and thus a cost of feedback link per PA 320 may be prohibitive). Moreover, in some examples, DPD correction may need to capture distortions on the far field beam (e.g., at the receiver 310) rather than per individual PA 320, such as for a purpose of accounting for cross-coupling PA non-linearity effects, which are not observed in transmission coupling feedback. Accordingly, in some examples, a transmitter 305 may employ an OTA-DPD procedure, in which the receiver 310 (e.g., a UE 120) calculates the transmitter 305's (e.g., a network node 110's) PA(s) 320 non-linearity coefficients or signals the non-linearity coefficients back to the transmitter 305. Aspects involving OTA-DPD procedures are described in more detail below in connection with FIG. 4.

Figure 4:
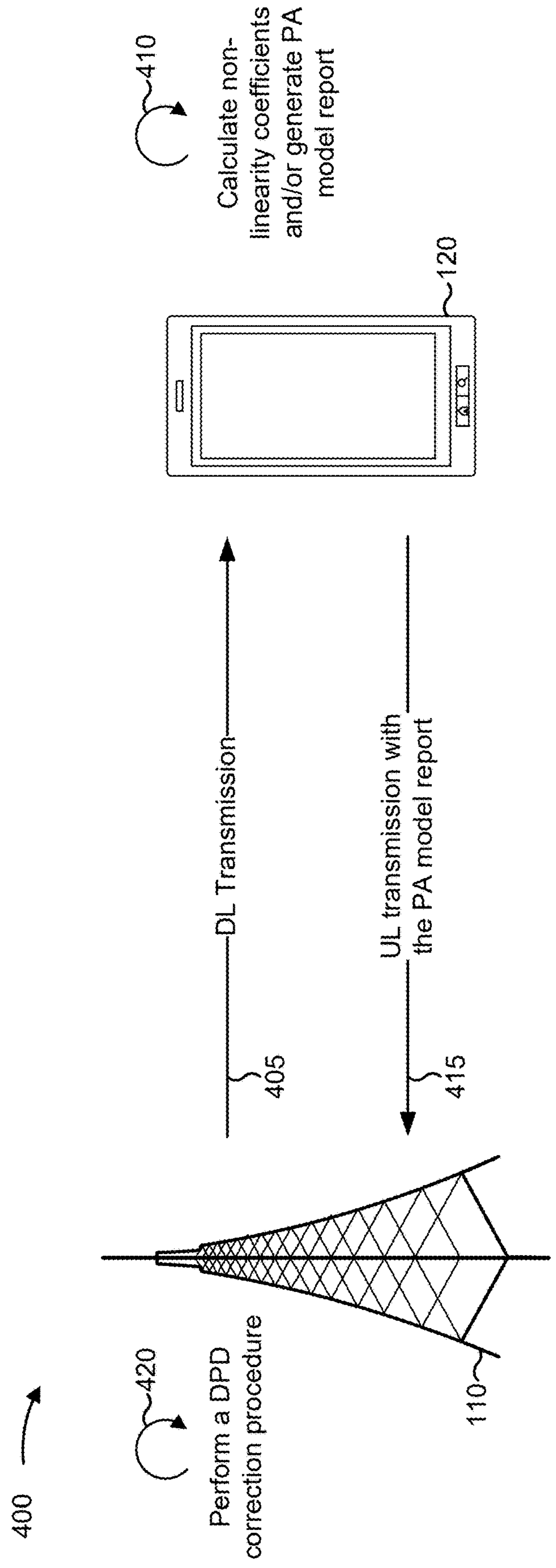
FIG. 4 is a diagram illustrating an example over-the-air digital pre-distortion (OTA-DPD) training session.

FIG. 4 is a diagram illustrating an example OTA-DPD training session 400. As shown in FIG. 4, a network node 110 (which, in some examples, corresponds to the transmitter 305) may communicate with a UE 120 (which, in some examples, corresponds to the receiver 310). In some examples, the network node 110 or the UE 120 may be configured to perform an OTA-DPD procedure. In an OTA-DPD procedure, a receiver (e.g., the UE 120) calculates PA non-linearity coefficients associated with a transmitter (e.g., the network node 110), and signals the non-linearity coefficients back to the transmitter. For example, as shown in FIG. 4, the network node 110 may transmit, and the UE 120 may receive, a DL transmission 405, which is sometimes referred to herein as an OTA-DPD training signal. Using the OTA-DPD training signal, the UE 120 may perform a PA model report computation procedure 410, in which the UE 120 computes one or more non-linearity coefficients associated with the network node 110's PA(s) or generates a PA model report that indicates the one or more non-linearity coefficients associated with the network node 110's PA(s). Moreover, the UE 120 may transmit, and the network node 110 may receive, an UL transmission 415 that indicates the PA model report. Using the PA model report, the network node 110 may perform a DPD correction procedure 420, such as for a purpose of removing a non-linear distortion noise floor for the network node 110's transmission chain. For example, at a next DL transmission, the network node 110 may apply an inverse of the estimated PA model in the transmission chain prior to the PA (e.g., PA 320) based on or otherwise associated with the feedback received from the UE 120.

This OTA-DPD training session 400 may be repeated in order to perform an accurate DPD correction procedure for current channel conditions, among other examples. Put another way, the network node 110 may schedule periodic or aperiodic OTA-DPD training sessions 400 in order to track changes to the PA model over time. In this way, during every iteration of the OTA-DPD training session 400, the network node 110 may transmit the DL transmission 405 (e.g., the OTA-DPD training signal) and the UE 120 may generate the PA model report or transmit the UL transmission 415 indicating the PA model report (e.g., PA model coefficients). In this way, the multiple OTA-DPD training sessions 400 may result in a considerable amount of UL overhead, resulting in a degraded data rate, among other examples. Moreover, using only one UE 120 to provide feedback (e.g., PA model reports) may result in a poorly estimated PA model and thus distorted signals from the network node 110 during subsequent DL transmissions, leading to communication errors and thus high computing, power, and network resource consumption for correcting communication errors.

Some techniques and aspects described herein enable improved PA model report signaling between one or more UEs 120 and a network node 110. For example, some techniques and aspects described herein relate to multiple UEs 120 providing OTA-DPD feedback to the network node 110 or to signaling of compressed PA model reports from the multiple UEs 120 to the network node. More particularly, in some aspects, the network node 110 may utilize a federated OTA-DPD training procedure associated with receiving OTA-DPD feedback from the multiple UEs 120. In such aspects, the network node 110 may transmit, to the multiple UEs 120, respective OTA-DPD training signals, and the network node 110 may receive, from the multiple UEs 120 in accordance with the OTA-DPD training signals, multiple PA model reports. The network node 110 may thus perform a DPD correction procedure for a transmission chain in accordance with the multiple PA model reports.

In some other aspects, one or more UEs 120 may provide OTA-DPD feedback to the network node 110 using a differential scheme. For example, the network node 110 may receive, from a UE 120, a first (e.g., full) PA model report in accordance with a first OTA-DPD training signal and a second (e.g., compressed) PA model report in accordance with a second OTA-DPD training signal. The first PA model report may indicate a set of data bits and a first set of parity bits, and the second PA model report may indicate a second set of parity bits that enable information associated with the second PA model report to be decoded using at least the second set of parity bits and the set of data bits.

In this way, the network node 110 and the UEs 120 may communicate with improved communication channels or reduced reporting overhead as compared to examples associated with the OTA-DPD training session 400 described above. For example, implementing the federated OTA-DPD procedure (e.g., using feedback from multiple UEs 120 to perform the DPD correction procedure) may improve the network node 110's DPD correction capabilities because the network node 110 may benefit from frequent updates of the non-linearity model, because the federated OTA-DPD training procedure may improve the estimation accuracy due to the processing gain of the multiple UEs 120, or because the federated OTA-DPD training procedure may enable aggregation of results from the multiple UEs 120 in aspects in which each UE 120 calculates only a subset of the data (e.g., due to bandwidth or processing limitations, among other examples). Additionally or alternatively, the differential scheme described above (e.g., transmitting, after a full PA model report, a compressed PA model report that is capable of being decoded using information in the full PA model report) may enable the UEs 120 to use reduced uplink resources for transmitting the PA model reports as compared to examples in which a full PA model report is transmitted for each OTA-DPD training signal, thereby resulting in increased bandwidth or data rates, decreased latency, and otherwise more efficient usage of network resources.

FIGS. 5A-5D are diagrams of examples associated with compressed PA model reports for OTA-DPD training. As shown by example 500 in FIG. 5A, a network node 110 (e.g., a base station, a CU, a DU, or an RU) may communicate with one or more UEs 120. In some aspects, the network node 110 and the UEs 120 may be part of a wireless network (e.g., the wireless communication network 100). The UEs 120 and the network node 110 may have established a wireless connection prior to operations shown in FIG. 5A. In some aspects, the network node 110 and the UEs 120 may be capable of performing a federated OTA-DPD training procedure or may be capable of reporting PA model reports using a differential scheme, among other examples.

In a first operation 502, the UEs 120 may transmit, and the network node 110 may receive, capability information. The capability information may be included in capability reports. The UEs 120 may transmit the capability information via uplink communications, sidelink communications, unicast communications, broadcast communications, UE assistance information (UAI) communications, UCI communications, sidelink control information (SCI) communications, MAC-CE communications, RRC communications, PUCCHs, PUSCHs, physical sidelink control channel (PSCCHs), or physical sidelink shared channel (PSSCHs), among other examples. The capability information may indicate one or more parameters associated with respective capabilities of the UEs 120. The one or more parameters may be indicated via respective information elements (IEs) included in a capability reports.

The capability information may indicate whether the UEs 120 support a feature or one or more parameters related to the feature. For example, the capability information may indicate a capability or parameter for performing a federated OTA-DPD training session. As another example, the capability information may indicate a capability or parameter for utilizing a differential scheme for an OTA-DPD training session. One or more operations described herein may be based on or otherwise associated with capability information. For example, the UEs 120 may perform communications in accordance with the capability information, or may receive configuration information that is in accordance with the capability information. In some aspects, the capability information may indicate UE support for receiving OTA-DPD training signals or transmitting PA model reports (e.g., full PA model reports or compressed PA model reports) in accordance with the OTA-DPD training signals. In some aspects, the network node 110 may request the capability information from the UEs 120, such as via respective MAC-CEs transmitted to the UEs 120. For example, the network node 110 may ask served UEs 120 (e.g., using a MAC-CE upon attachment) for an indication regarding their capability of preforming DPD estimation (e.g., PA model estimation).

In a second operation 505, the network node 110 may transmit, and the UEs 120 may receive, configuration information. In some aspects, the UEs 120 may receive the configuration information via one or more of system information signaling (e.g., a master information block (MIB) or a system information block (SIB), among other examples), RRC signaling, MAC signaling (e.g., one or more MAC-CEs), or physical layer signaling (e.g., DCI), among other examples.

In some aspects, the configuration information may indicate one or more candidate configurations or communication parameters. In some aspects, the one or more candidate configurations or communication parameters may be selected, activated, or deactivated by a subsequent indication. For example, the subsequent indication may select a candidate configuration or communication parameter from the one or more candidate configurations or communication parameters. In some aspects, the subsequent indication may include a dynamic indication, such as one or more MAC-CEs or one or more DCI messages, among other examples.

In some aspects, the configuration information may include an indication of a selection of one or more configuration parameters (e.g., a selection of the one or more configuration parameters already known to the UE 120 or previously indicated by the network node 110 or other network device), or explicit configuration information for the UEs 120 to use to configure the UEs 120, among other examples.

In some examples, the configuration information may not be expressly signaled to the UEs 120. For example, in some aspects, the configuration information may at least partially be defined by a wireless communication standard, such as the 3GPP. In such examples, the network node 110 may not explicitly indicate such configuration information to the UEs 120. For example, the UEs 120 may optionally obtain at least a portion of the configuration information from a configuration stored by the UEs 120 (e.g., an original equipment manufacturer (OEM) configuration). In some aspects, the configuration information may include a parameter or index that is indicative of information defined, or otherwise fixed, by a wireless communication standard, such as the 3GPP (e.g., rather than explicitly indicating the information).

As described in more detail below, in some aspects the network node 110 and the UEs 120 may perform a federated OTA-DPD training procedure, in which PA model reports are received, by the network node 110, from the multiple UEs 120 or in which the network node 110 performs a DPD correction procedure in accordance with the PA model reports received from the multiple UEs 120. In such aspects, the configuration information may include an indication that OTA-DPD training signals to be sent to the UEs 120 are associated with the federated OTA-DPD training procedure performed with the multiple UEs 120.

Additionally or alternatively, the configuration information may include an indication of an assumed PA model for the federated OTA-DPD training procedure. For example, the network node 110 may indicate, to the UEs 120, that the assumed PA model for the federated OTA-DPD training procedure is a polynomial model with K=2 (which is described in more detail below), among other examples. Moreover, as described in more detail below, in some aspects the multiple UEs 120 may be configured to perform a differential scheme for the federated OTA-DPD training procedure in which the UEs 120, for a subset of the received OTA-DPD training signals, transmit compressed PA model reports that include only a segment of a full codeword associated with an OTA-DPD training signal. In such aspects, the configuration information may indicate segment lengths to be used for respective PA model reports.

The UEs 120 may configure themselves based at least in part on the configuration information. In some aspects, the UEs 120 may be configured to perform one or more operations described herein based at least in part on the configuration information.

In a third operation 510, the network node 110 may transmit, and the multiple UEs 120 may receive, respective OTA-DPD training signals. Moreover, in a fourth operation 515, the UEs 120 may calculate PA model reports in accordance with the OTA-DPD training signals. As described in more detail below in connection with FIGS. 5C and 5D, in some aspects, some of the OTA-DPD training signals may be used by one or more UEs 120 to calculate or signal a full PA model report (e.g., a report in which estimated non-linearity coefficients associated with the PA model are calculated or reported to the network node using a codeword including data bits and a full set of parity bits), while other ones of the OTA-DPD training signals may be used by the one or more UEs 120 to calculate or signal a compressed PA model report (e.g., a report in which a codeword associated with the estimated non-linearity coefficients is calculated by the one or more UEs but only a portion of the parity bits are signaled to the network node 110). In that regard, the fourth operation 515 may include, in some instances, calculating a full PA model report (e.g., a full codeword including data bits and a full set of parity bits), and, in other instances, calculating a compressed PA model report (e.g., a portion of a set of parity bits associated with a codeword).

In a fifth operation 520, the multiple UEs 120 may transmit, and the network node 110 may receive, multiple PA model reports in accordance with the OTA-DPD training signals. Moreover, as described above in connection with the fourth operation 515, in some aspects the multiple PA model reports may include at least one full PA model report (e.g., a report that includes a full codeword calculated by a UE 120, including data (e.g., systematic) bits and a full set of parity bits) and at least one compressed PA model report (e.g., a report that includes only a portion of parity bits associated with a full codeword). Put another way, in some aspects the multiple PA model reports may include at least a first PA model report (e.g., a full PA model report) indicating a set of data bits and a first set of parity bits, and a second PA model report (e.g., a compressed PA model report) indicating at least a second set of parity bits that enable information associated with the second PA model report to be decoded using at least the second set of parity bits and the set of data bits. Aspects of transmitting full and compressed PA model reports and decoding compressed PA model reports are described in more detail below in connection with FIGS. 5C and 5D.

In a sixth operation 525, the network node 110 may decode information associated with the multiple PA model reports. For example, with respect to any full PA model reports received by the network node 110 via the fifth operation 520, the network node 110 may decode the data included therein (e.g., the estimated non-linear coefficients for the PA model) using the information provided in the full PA model report (e.g., the data bits and the full set of parity bits). Moreover, with respect to any compressed PA model reports received by the network node 110 via the fifth operation 520, the network node 110 may decode information associated with the compressed PA model report using the portion of parity bits signaled in the compressed PA model report as well as information decoded from other PA model reports. For example, in some aspects, the network node 110 may decode information associated with a compressed PA model report using at least the portion of parity bits signaled in the compressed PA model report and a set of data bits signaled in a full PA model report. Aspects of decoding information associated with a compressed PA model report are described in more detail below in connection with FIG. 5D.

In a seventh operation 530, the network node 110 may perform a DPD correction procedure for a transmission chain in accordance with the multiple PA model reports. For example, in a similar manner as described above in connection with FIG. 3, at a next downlink transmission, the network node 110 may apply an inverse of the estimated PA model in the transmission chain prior to the PA (e.g., PA 320) based on or otherwise associated with the feedback (e.g., the multiple PA model reports) received from the multiple UEs 120.

Figure 5A:
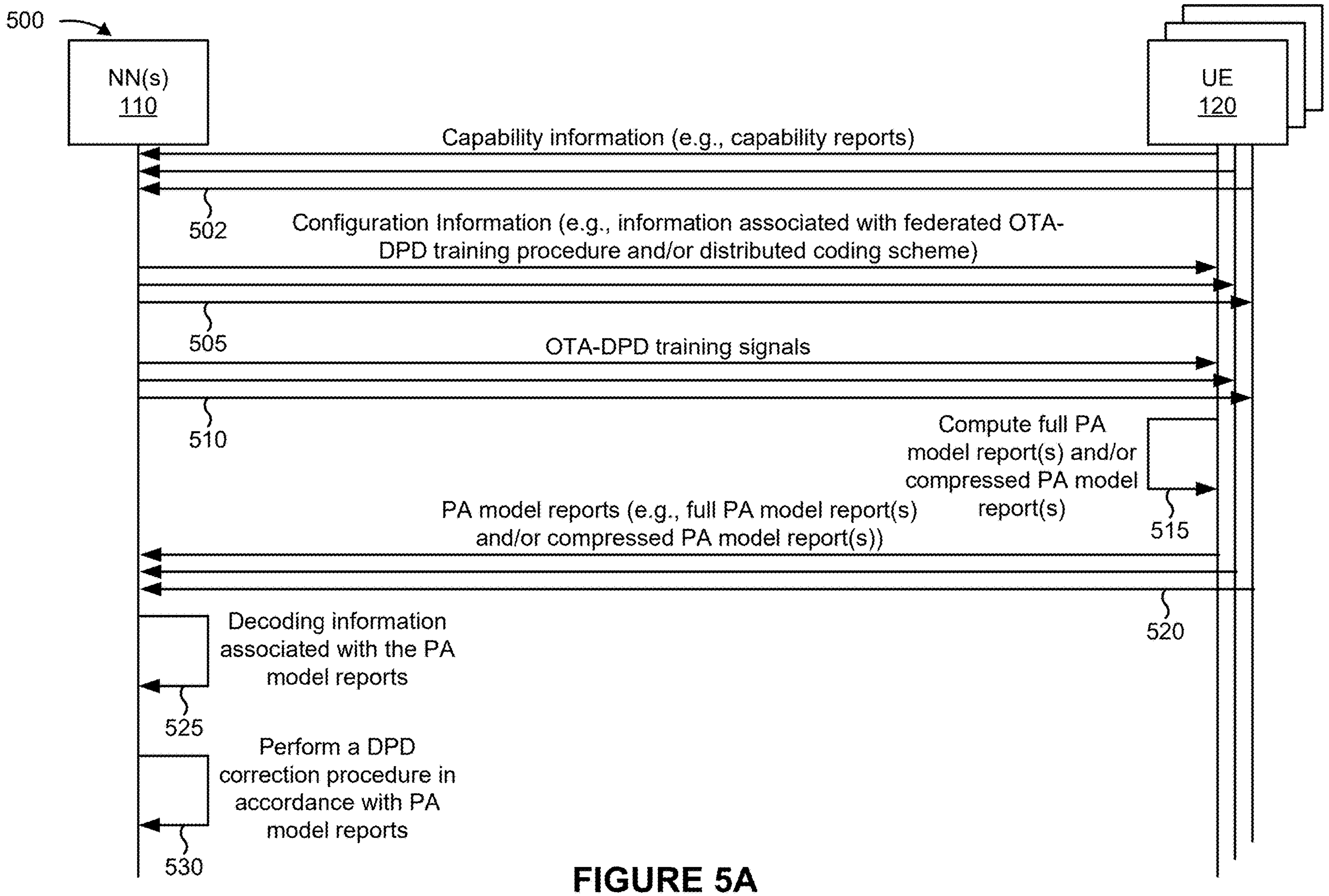
FIGS. 5A-5D are diagrams of examples associated with compressed PA model reports for OTA-DPD training.
Figure 5B:
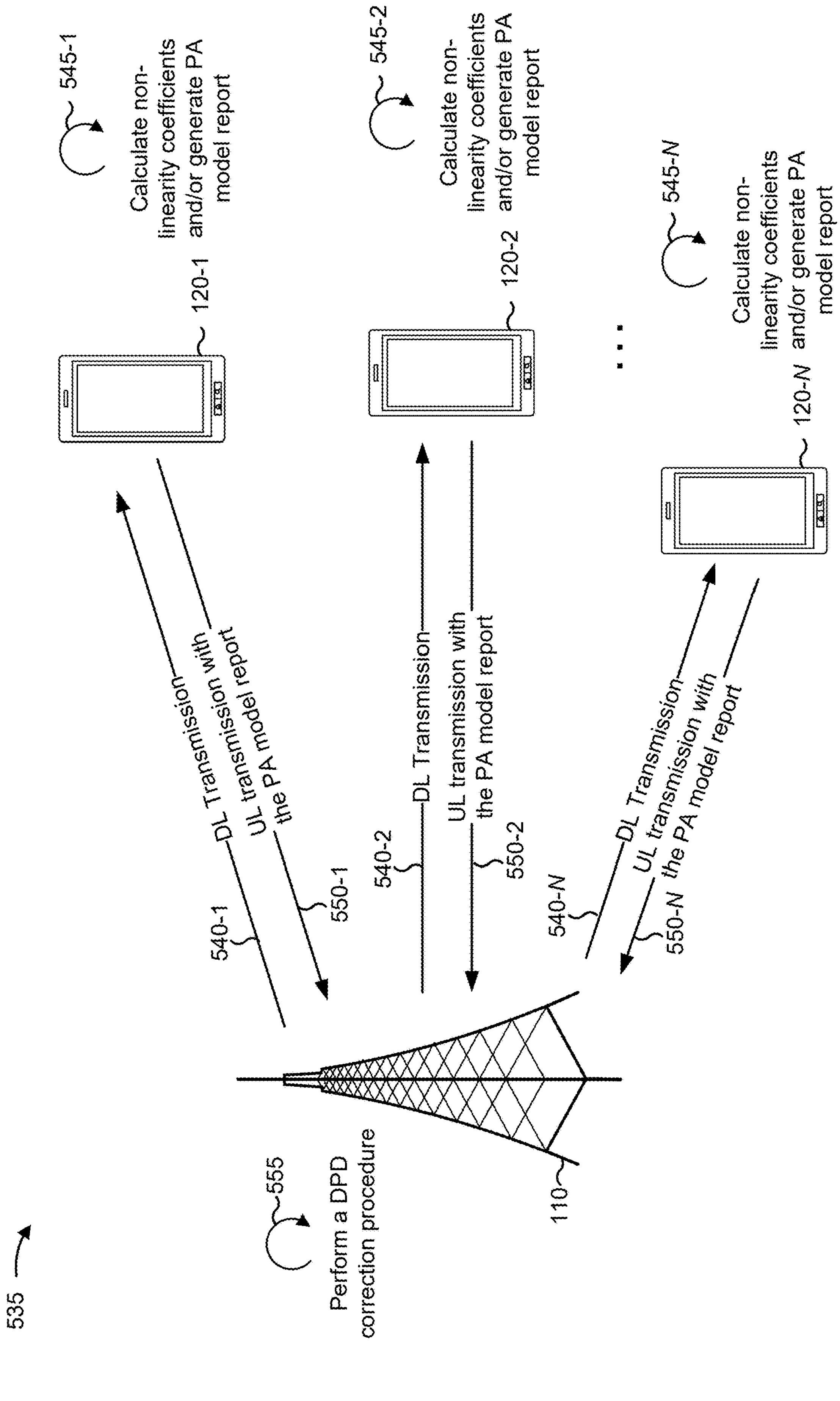

FIG. 5B is an example 535 associated with a federated OTA-DPD training procedure, such as the federated OTA-DPD training procedure described above in connection with FIG. 5A. In that regard, as shown in FIG. 5B, the network node 110 may communicate with multiple (e.g., N) UEs 120, shown in FIG. 5B as a first UE 120-1 through an $N^{th}$ UE 120-N. After configuring the multiple UEs 120 to perform the federated OTA-DPD training procedure (e.g., via the configuration information described above in connection with the second operation 505), the network node 110 may transmit, to the multiple UEs, respective DL transmissions 540 (indexed in FIG. 5B as a first DL transmission 540-1 through an $N^{th}$ DL transmission 504-N), which may correspond to OTA-DPD training signals described above. The UEs 120 may, in turn, perform respective PA model report calculation operations 545 (indexed in FIG. 5B as a first PA model report calculation operation 545-1 through an $N^{th}$ PA model report calculation operation 545-N) in accordance with the corresponding DL transmissions 540. For example, each UE 120 may calculate non-linearity coefficients associated with the PA model and generate a full PA model report or a compressed PA model report, in a similar manner as described above in connection with FIG. 5A.

The UEs 120 may transmit, and the network node may receive, respective UL transmissions 550 (indexed in FIG. 5B as a first UL transmission 550-1 through an $N^{th}$ UL transmission 550-N) that indicate the PA model reports. Moreover, the network node 110 may perform a DPD correction procedure 555 in accordance with the multiple PA model reports. For example, and in a similar manner as described above in connection with the DPD correction procedure 420, the DPD correction procedure 555 may be associated with removing a non-linear distortion noise floor for the network node 110's transmission chain, such as by, at a next DL transmission, applying an inverse of the estimated PA model in the transmission chain prior to the PA (e.g., PA 320) based on or otherwise associated with the feedback received from the UEs 120.

Using feedback (e.g., the multiple PA model reports) from multiple UEs 120 to perform the DPD correction procedure 555 may improve the DPD correction capabilities of the network node 110 because the network node 110 may benefit from frequent updates of the non-linearity model from the multiple UEs. Additionally or alternatively, using feedback from multiple UEs 120 to perform the DPD correction procedure 555 may improve the DPD correction capabilities of the network node 110 because the federated OTA-DPD training procedure may improve the estimation accuracy due to the processing gain of the multiple UEs 120. Additionally or alternatively, using feedback from multiple UEs 120 to perform the DPD correction procedure 555 may improve the DPD correction capabilities of the network node 110 because the federated OTA-DPD training procedure may enable aggregation of results from the multiple UEs 120, such as in aspects in which each UE 120 calculates only a subset of the data (which, in some aspects, may be motivated by limited computation capacity per UE 120 or limited bandwidth allocated to each UE 120, among other examples).

Figure 5C:
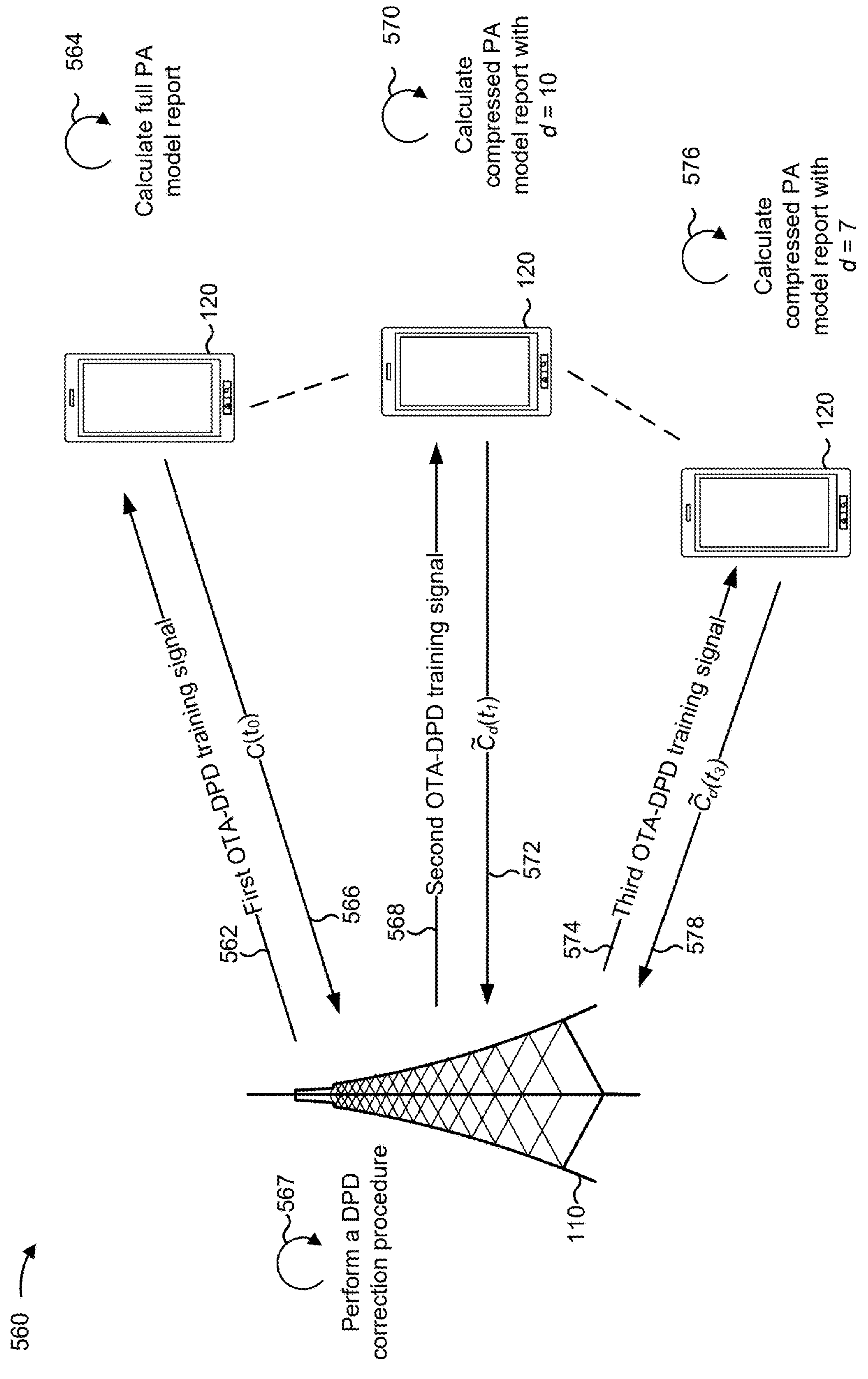

In some aspects, using a federated OTA-DPD training procedure associated with multiple UEs 120, such as the federated OTA-DPD training procedure described above in connection with example 535, may result in consumption of a relatively large amount of uplink resources needed to accommodate the feedback (e.g., the PA model reports transmitted by the multiple UEs 120), particularly when the network node 110 utilizes a high quantity of transmission antennas (such as in mmWave aspects, among other examples). Accordingly, and as described above in connection with FIG. 5A, in some aspects the one or more UEs 120 may utilize a differential scheme to report the OTA-DPD feedback (e.g., the PA model reports). For example, FIG. 5C shows an example 560 of a differential scheme implemented by a UE 120 (e.g., one of the multiple UEs 120 described above in connection with FIGS. 5A and 5B).

As shown in example 560, the network node 110 may transmit multiple DL transmissions (e.g., multiple OTA-DPD training signals) to the UE 120 and, in response, the UE 120 may transmit multiple UL transmissions to the network node 110 providing OTA-DPD feedback (e.g., PA model reports). A first OTA-DPD training signal 562 may be associated with an initial estimate of the PA model coefficients. In this regard, for a first scheduled report of the differential scheme, the network node 110 may request (e.g., via the configuration information described above in connection with the second operation 505) that the UE 120 prepare a full PA model report (sometimes referred to herein as $C(t_0)$). Accordingly, the UE 120 may perform a first PA model report calculation operation 564 in accordance with the first OTA-DPD training signal 562. The first PA model report calculation operation 564 may include the UE 120 estimating a full set of coefficients for an assumed PA model or generating a codeword to report the set of coefficients to the network node 110 that includes a set of data bits (e.g., systematic bits) and a set of parity bits.

For example, in some aspects the non-linearity (NL) impairment at the network node 110 transmission chain may be represented as an infinite odd polynomial expression, such as $$NL(x(t)) = \sum_{n=0}^{\infty} c_n x|x|^{2(n+1)}.$$

In such aspects, a DPD algorithm may seek to estimate the NL characteristics in each transmission antenna as a finite degree polynomial. For example, the PA characteristics may be approximated using the expression $$L_t(x) \approx \sum_{n=0}^{K} c_{t,n} x|x|^{2(n+1)},$$

where t is the transmission antenna index and K is a size of a kernel set. In such aspects, estimating the NL coefficients $$\{c_{t,n}\}_{n=0}^{K}$$

for each transmission antenna t yields the estimation of the corresponding NL distortion. For example, in aspects associated with estimating or correction of NL distortion for a single input single output (SISO) communication system with K=2, the coefficients to be estimated would be $$\{c_n\}_{n=0}^{2} = \{c_0, c_1, c_2\}.$$

The estimation model may be enhanced for more complex systems, such as MIMO communication systems, aspects in which K>2, or for an estimation that also includes memory components.

Returning to the SISO communication system example, the observed signal, y(t), at the UE 120, with the NL impairment, may be approximated by the following polynomial model:

$$y(t) = h(t) * \left(x(t) + NL(x(t)) = h(t) * x(t) + h(t) * \sum_{n=0}^{K} c_n x|x|^{2(n+1)} + \text{noise}(t),\right.$$

where * corresponds to the convolution operator, h(t) corresponds to the time domain representation of the channel, x(t) corresponds to the transmitted signal, and NL(x(t)) corresponds to the NL distortion. Accordingly, for aspects in which K=2, the observed signal may be approximated as $y(t)=h(t)*[x(t)+c_1x(t)|x(t)|^2+c_2x(t)|x(t)|^4+c_3x(t)|x(t)|^6]+\text{noise}(t)$. Using a DMRS or a similar pilot signal, the UE 120 may estimate the channel (sometimes referred to as $\hat{h}(t)$) or may convolve the estimated channel with the OTA-DPD training signal to generate $\hat{h}(t)*x(t)$.

Moreover, the UE 120 may then subtract $\hat{h}(t)*x(t)$ from the observed signal y(t) to generate ξ(t), which may correspond to the observed NL impairment after the channel influence (e.g., $\xi(t)=y(t)-\hat{h}(t)*x(t)$). In such aspects, and from the expressions described above, it can be concluded that $$\underbrace{y(t) - \hat{h}(t) * x(t)}_{\xi(t)} = c_0 \underbrace{\hat{h}(t) * x(t)|x(t)|^2}_{\psi_0(t)} + c_1 \underbrace{\hat{h}(t) * x(t)|x(t)|^4}_{\psi_1(t)} + c_2 \underbrace{\hat{h}(t) * x|x|^6}_{\psi_2(t)} + \text{noise}(t),$$

where $$\{\psi_i(t)\}_{i=0}^{2}$$

correspond to the PA's estimated polynomial components after the channel influence. In that regard, assuming that x(t) includes N samples, $$\begin{bmatrix} \xi(0) \\ \xi(1) \\ \vdots \\ \xi(N-1) \end{bmatrix} = \underbrace{\begin{bmatrix} \psi_0(0) & \psi_1(0) & \psi_2(0) \\ \psi_0(1) & \psi_1(1) & \psi_2(1) \\ \vdots & \vdots & \vdots \\ \psi_0(N-1) & \psi_1(N-1) & \psi_2(N-1) \end{bmatrix}}_{M} \underbrace{\begin{bmatrix} c_0 \\ c_1 \\ c_2 \end{bmatrix}}_{\theta} + \begin{bmatrix} \text{noise}(0) \\ \text{noise}(1) \\ \vdots \\ \text{noise}(N-1) \end{bmatrix}.$$

Accordingly, the least-square (LS) estimator may be given by: $\hat{\theta}=[\hat{c}_0,\hat{c}_1,\hat{c}_2]=(M^H M)^{-1}M^H\cdot\xi(t)$. In this way, after estimating the coefficients, the estimated NL estimator is given by $$\widehat{NL}(x(t)) = \sum_{n=0}^{2} \hat{c}_n x(t)|x(t)|^{2(n+1)}.$$

In some aspects, the channel may be estimated again with respect to the OTA-DPD training signal (e.g., by applying the estimated NL model on the known pilot) to improve the channel estimation accuracy. In such aspects, the NL model may be iteratively estimated until an error associated with the calculated coefficients falls below a threshold, among other examples.

Returning to the example 560, after performing the first PA model report calculation operation 564, the UE 120 may signal a first PA model report 566 (e.g., a full PA model report, shown in FIG. 5C as $C(t_0)$) to the network node 110. In this regard, the first PA model report 566 may include the full PA model estimation, such as, for the example described above involving a SISO communication system with K=2, three PA model coefficients: $[\hat{c}_0,\hat{c}_1,\hat{c}_2]$. In some aspects, the information included in the full PA model report (e.g., the first PA model report 566) may be protected by a robust systematic encoding with a low rate or low operated modulation, such as for a purpose of ensuring that the initial estimation will be decoded successfully by the network node 110. Additionally or alternatively, the full PA model report (e.g., the PA model coefficients) may be quantized using Gray coding (e.g., using a reflected binary code (RBC)) or a similar coding procedure, such as for a purpose of ensuring that small Euclidean changes of the coefficients' values result in a small quantity of bit alterations. For example, a Gray code associated with eight symbols (e.g., using three bits) may include representing a first symbol (associated with a quantization bin of $\{\text{min},\text{threshold}_1\}$) as 000, representing a second symbol (associated with a quantization bin of $\{\text{threshold}_1,\text{threshold}_2\}$) as 001, representing a third symbol (associated with a quantization bin of $\{\text{threshold}_2,\text{threshold}_3\}$) as 011, representing a fourth symbol (associated with a quantization bin of $\{\text{threshold}_3,\text{threshold}_4\}$) as 010, representing a fifth symbol (associated with a quantization bin of $\{\text{threshold}_4,\text{threshold}_5\}$) as 110, representing a sixth symbol (associated with a quantization bin of $\{\text{threshold}_5,\text{threshold}_6\}$) as 111, representing a seventh symbol (associated with a quantization bin of $\{\text{threshold}_6,\text{threshold}_7\}$) as 101, or representing an eighth symbol (associated with a quantization bin of $\{\text{threshold}_7,\text{threshold}_8\}$) as 100.

In some aspects, the first PA model report 566 (e.g., the UL transmission including the full PA model report or the full set of estimated coefficients) may include a codeword including a set of data bits (e.g., uncoded bits or systematic bits) representing the coefficients and a set of parity bits to be used for decoding or error correction of the data bites. For example, returning to the above example involving three coefficients to be signaled to the network node (e.g., $[\hat{c}_0,\hat{c}_1,\hat{c}_2]$), assuming that each coefficient can be represented by eight bits and that the operated MCS is quadrature phase sift keying (QPSK) with a rate of 1/3, the first PA model report 566 may include 24 uncoded bits (sometimes referred to as k), 72 coded bits (sometimes referred to as n), and 48 parity bits (e.g., n−k=48), and thus may require 36 resource elements (REs) for transmission (because two bits may be transmitted in each RE for QPSK).

Upon receiving the first PA model report 566 (e.g., the full PA model report), the network node 110 may decode the PA model report (e.g., $C(t_0)$) or may perform a DPD correction procedure 567 using the decoded PA model values. For example, the network node 110 may use the decoded PA model values to apply an inverse model on a next DL transmission, before the PA (e.g., PA 320) in the transmission chain.

In some aspects, the network node 110 may transmit, and the UE 120 may receive, a second OTA-DPD training signal 568. In a similar manner as described above in connection with the first PA model report calculation operation 564, the UE 120 may perform a second PA model report calculation operation 570, such as by estimating the NL coefficients for the assumed PA model using the second OTA-DPD training signal 568. In this instance, however, the UE 120 may not report a full PA model report to the network node 110, but rather may only report a portion of the PA model report (e.g., a portion of the codeword), shown in FIG. 5C as $\tilde{C}_d(t_1)$, such as for a purpose of conserving UL resources.

More particularly, a full PA model report associated with the second OTA-DPD training signal 568 (sometimes referred to herein as $C(t_1)$) may have a strong correlation with the full PA model report associated with the first OTA-DPD training signal 562 (e.g., $C(t_0)$). That is, in accordance with information theory, $H(C(t_1))=H(C(t_0))+H(C(t_1)|C(t_0))$, where $H(\bullet)$ corresponds to the entropy operator. Accordingly, $H(C(t_1))\geq H(C(t_1)|C(t_0))$, meaning that, to conclude $H(C(t_1))$, the network node 110 may need to be provided with less information than $(H(C(t_1)|C(t_0)))$ because the network node 110 already decoded $H(C(t_0))$ (e.g., in connection with the first PA model report 566) and there is a strong correlation between the PA model coefficients at $t_0$ and $t_1$. Accordingly, the UE 120 may select a subset of bits associated with a full PA model report to be reported in connection with the second OTA-DPD training signal. For example, the network node 110 may indicate, to the UE 120 (e.g., via the configuration information described above in connection with the second operation 505), a segment length (sometimes referred to herein as d) to be used for the compressed PA model report, and the UE 120 may select, from a full PA model report or codeword, a segment corresponding to the segment length to be reported as the compressed PA model report.

For example, and as described in more detail below in connection with FIG. 5D, the UE 120 may select a first portion of the parity bits associated with the codeword corresponding to a full PA model report as the segment to be transmitted to the network node 110. In such examples, the network node 110 may signal a segment length (e.g., d) to be used for the second PA model report, such as a segment length of 10 (e.g., d=10) as shown in FIG. 5C in connection with the second PA model report calculation operation 570. According, in the second PA model report calculation operation 570, the UE 120 may calculate a codeword (e.g., returning to the example described above, a codeword having 24 data bits, 72 coded bits, and 48 parity bits) or may select a segment of the codeword (e.g., the first 10 parity bits in the example in which d=10) as the second PA model report.

The UE 120 may thus transmit, and the network node 110 may receive, a second PA model report 572 (e.g., $\tilde{C}_d(t_1)$), which, as described above, may only be a portion of parity bits associated with a full PA model report. Nonetheless, as described above, due to the high correlation of the data (e.g., systematic) part of the full PA model report to previously transmitted full PA model reports, transmitting the data (e.g., systematic) part of the codeword might only slightly increase the entropy (e.g., information). Instead, the parity bits may have much less correlation with a previous report, and, more particularly, a beginning portion of the parity bits has higher entropy compared with the rest of the parity bits since typically the code is designed to accommodate higher weight on early parity bits (e.g., because these parity bits are connected to many other bits). Accordingly, a most efficient compressed PA model report may be a report that contains bits associated with the highest additional entropy (e.g., information) compared to the previous report, which, as described above, may be the beginning of the parity. In this way, notwithstanding that the second PA model report 572 includes only parity bits, the network node 110 may still be able to decode information associated with the second PA model report 572 (e.g., the full codeword), as described in more detail below in connection with FIG. 5D. Accordingly, upon receiving the second PA model report 572, the network node 110 may decode the information associated with the second PA model report 572 or perform the DPD correction procedure 567 using the decoded information.

In this way, uplink overhead associated with PA model reports may be reduced, thus resulting in increased bandwidth or data rates, among other examples. For example, returning to the above example involving codewords including 72 coded bits, if the second PA model report 572 is associated with a segment length (e.g., d) of 10, transmitting only 10 parity bits rather than the 72 coded bits may result in an 86% overhead savings for the transmission of the compressed PA model report (as compared to transmission of the full PA model report).

The OTA-DPD training procedure may proceed in a substantially similar manner for third and subsequent OTA-DPD training signals. Moreover, segment lengths may differ between subsequent PA model reports or may vary depending on channel conditions, the success or failure of previous decoding procedures, or the like. For example, in some aspects, the network node 110 may transmit, and the UE 120 may receive, a third OTA-DPD training signal 574, which may be substantially similar to the first OTA-DPD training signal 562 or the second OTA-DPD training signal 568. In that regard, the UE 120 may perform a third PA model report calculation operation 576 using the third OTA-DPD training signal 574. In this aspect, however, the UE 120 may be signaled (e.g., via the configuration information described above in connection with the second operation 505, or otherwise) to use a different segment length (e.g., d) than was used for the second PA model report, such as a segment length of 7, as shown in FIG. 5C in connection with the third PA model report calculation operation 576. Accordingly, the UE 120 may calculate a full PA model report (e.g., a full codeword) and select a 7-bit segment thereof (e.g., the first 7 bits of the parity portion) to be signaled to the network node 110. The UE 120 may thus transmit, and the network node 110 may receive, a third PA model report 578 (shown as $\tilde{C}_d(t_2)$, which may be a compressed PA model report or a portion of the parity bits associated with a full PA model report). Furthermore, the network node 110 may decode information associated with the third PA model report (e.g., using the parity bits included in the third PA model report 578 or systematic bits associated with one or more previous PA model reports) and thus perform the DPD correction procedure 567 using the decoded information.

In some aspects, a segment length (e.g., d) associated with a given PA model report may be selected by the network node 110 based at least in part on some network node 110 policy or criteria. For example, the segment length may be selected in accordance with an autocorrelation of each PA coefficient included in the PA model. In such examples, the network node 110 may learn the autocorrelation from a training period during which the network node 110 may request full estimations (e.g., full PA model reports) from different UEs 120, or the network node 110 may learn the autocorrelation from an offline learning operation (e.g., in laboratory prior to deployment of the network node 110). Additionally or alternatively, the segment length may be selected in accordance with an amount of time that has elapsed from the last update of the PA model (e.g., between subsequent OTA-DPD training signal transmissions). In some aspects, the segment length may be selected in accordance with a reliability of the decoded bits from the latest detection (e.g., in accordance with the calculated latest log-likelihood-ratios (LLRs)). Additionally or alternatively, the segment length may be selected in accordance with temperature changes from a previous report arrival. In some aspects, the network node 110 may request more bits (e.g., use a larger segment length) to serve as a safety gap or to increase a certainty of the detection. Additionally or alternatively, the network node 110 may request a full updated estimation (e.g., a full PA model report), such as in aspects in which the network node 110 determines that there is no correlation between the current and the latest report (e.g., due to time passing, high temperature variation, or other environmental factors, among other examples).

Figure 5D:
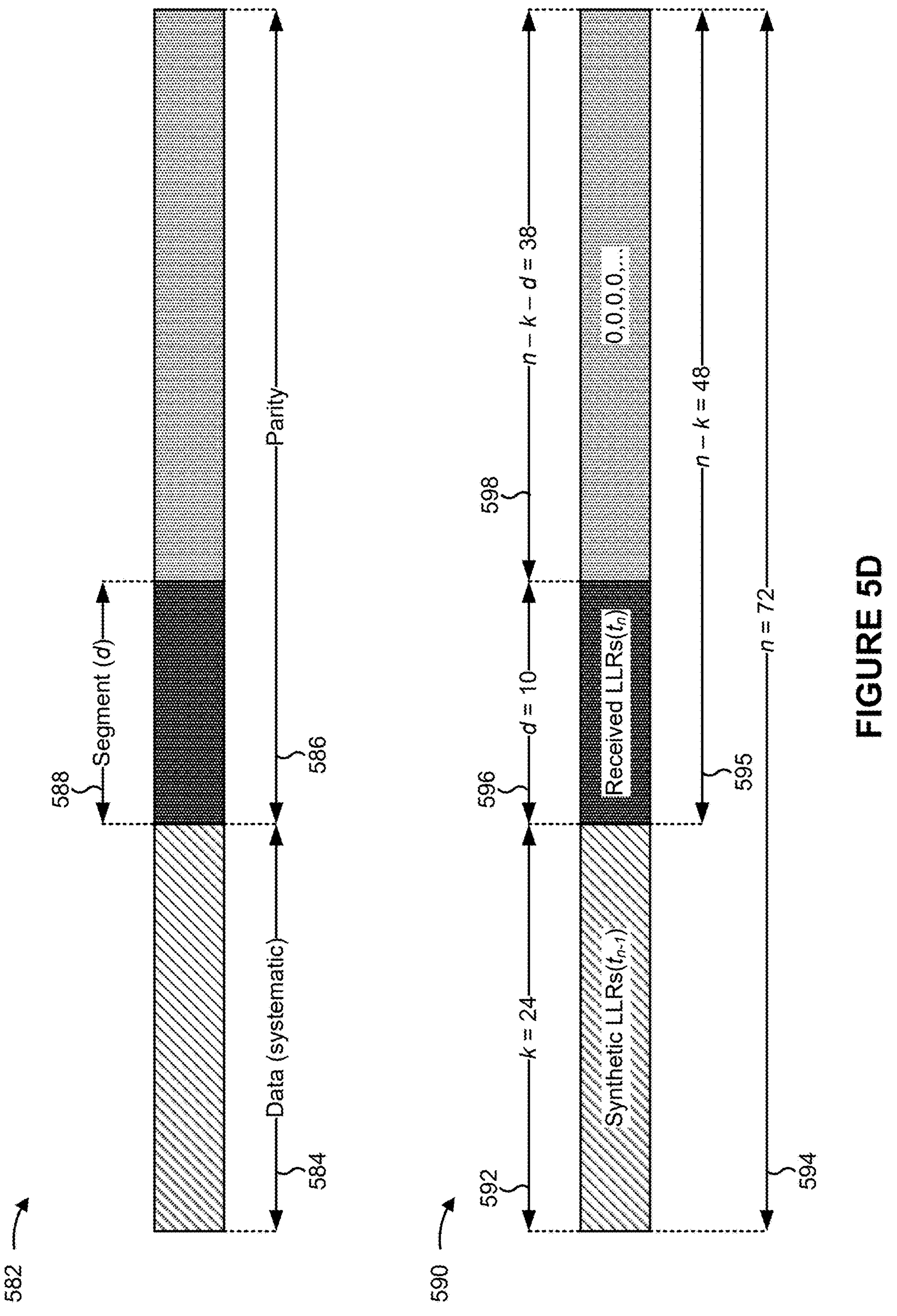

FIG. 5D shows examples associated with a differential scheme decoding procedure performed by the network node, such as a procedure associated with decoding compressed PA model reports in connection with performing the DPD correction procedures 555, 567 described above in connection with FIGS. 5B and 5C. More particularly, FIG. 5D shows an example codeword 582 associated with a PA model report. In a similar manner as described above in connection with FIG. 5C, the codeword 582 may include a data portion 584 (shown using hatching) and a parity portion 586 (shown using stippling). In aspects in which the UE 120 transmits a full PA model report to the network node 110, such as the first PA model report 566 described above in connection with FIG. 5C, the UE 120 may transmit the full codeword 582 to the network node 110. However, in aspects in which the UE 120 transmits a compressed PA model report to the network node 110, such as the second PA model report 572 or the third PA model report 578 described above in connection with FIG. 5C, the UE 120 may transmit only a portion of the codeword 582 to the network node 110, such as a segment 588 (shown using dark stippling) having a segment length (e.g., d) indicated by the network node 110 or corresponding to a beginning portion of the parity portion 586. For example, the UE 120 may transmit the first d bits of the parity portion 586, as described above in connection with FIG. 5C.

In such aspects, after receiving the compressed PA model report (e.g., the beginning portion of the parity portion 586 of the codeword 582), the network node 110 may attempt to reconstruct or decode the entire codeword 582. More particularly, FIG. 5D further shows an example 590 associated with the network node reconstructing or decoding a codeword associated with a compressed PA model report. In a similar manner as described above in connection with FIG. 5C, the example 590 may be associated with three NL coefficients (e.g., $[\hat{c}_0, \hat{c}_1, \hat{c}_2]$) that may be represented by eight bits, and an MCS for the codeword may be associated with a rate of 1/3, such that a codeword (e.g., codeword 582) associated with a full PA model report includes 24 uncoded bits 592 (k=24), 72 coded bits 594 (e.g., n=72), and 48 parity bits 595 (e.g., n−k=48). Moreover, the UE 120 may be signaled to transmit a compressed PA model report with a segment length of 10 (e.g., d=10), such that the only portion of the codeword received by the network node is a first 10 parity bits 596 of the codeword.

In such aspects, to reconstruct or decode a codeword associated with a compressed PA model report, the network node 110 may concatenate three different segments as an input to the decoder. First, the network node 110 may use, as the data portion of the codeword (e.g., the portion of the codeword corresponding to the uncoded bits 592), synthetic LLRs that represent decoded data from a previous PA model report or time (shown in FIG. 5D as "synthetic LLRs($t_{n-1}$)"). In some aspects, to calculate the synthetic LLRs, the network node 110 may determine a sign of each LLR in accordance with a decoded bit at the previous decoding (e.g., ($t_{n-1}$)), such as a negative value for a bit that was decoded as "1" at the previous decoding and a positive value for a bit that was decoded as "0" at the previous decoding.

Moreover, the network node 110 may determine an absolute value (e.g., an amplitude) of each LLR based on or otherwise associated with one or more factors. For example, in some aspects, an absolute value of an LLR that represents a most significant bit (MSB) of a DPD coefficient may be high, due to the low probability that this bit changed. On the other hand, an absolute value of an LLR that represents a least significant bit (LSB) of a DPD coefficient may be low, due to a higher probability that the bit may have changed between reports. Additionally or alternatively, an absolute value of an LLR may be in accordance with whether the LLR typically changes between subsequent OTA-DPD training signals or PA model reports. For example, an LLR that tends to change with a high rate (e.g., in accordance with the latest reports) may have a large absolute value, while an LLR that tends to change with a low rate may have a small absolute value. In some aspects, an absolute value of an LLR may be set in accordance with how the chosen PA model parameters tend to change. For example, for a polynomial PA model, a first-order-degree component may tend to change with a low rate and thus the absolute values of the LLRs that represent the first-order-degree coefficient may be high. In some aspects, absolute values of the synthetic LLRs may be set in accordance with other factors associated with the network node 110 policy.

Next, the network node 110 may use, as a beginning portion of the parity portion of the codeword (e.g., the portion of the codeword corresponding to the first 10 parity bits 596), calculated LLRs of the current report of the PA model (shown in FIG. 5D as "received LLRs($t_n$)"). Finally, due to a lack of information associated with the remaining parity bits, the LLRs for the remaining portion of the codeword (e.g., the portion of the codeword corresponding to the final 38 parity bits 598) may be set to zeroed LLRs. Put another way, due to the lack of information associated with the final 38 parity bits 598, the LLRs are assumed to have an equal probability of being 0 or 1, and thus all LLRs are set to 0 for purposes of decoding the PA model report.

The network node 110 may thus input the concentrated LLRs (e.g., the synthetic LLRs, the received LLRs, and the zeroed LLRs, as shown in connection with example 590) to a decoder (e.g., an LDPC decoder, among other examples). In this regard, in accordance with the differential scheme described herein or the network node 110 selection of the segment length parameter (e.g., d), the bits may be successfully decoded by the decoder. In such aspects, the current (e.g., decoded) PA model report may be used to determine the synthetic portion (e.g., the synthetic LLRs) in a decoding process for a subsequently received report, in a similar manner as described above.

In some aspects, the network node 110 may fail in decoding the reconstructed codeword (e.g., the codeword shown in connection with example 590). For example, the decoding process may return a cyclic redundancy check (CRC) error, among other examples. In such aspects, the network node 110 may ignore the current PA model report and instead use a last successfully decoded PA model report for performing a DPD correction procedure. In such aspects, the network node 110 may reconfigure the UE 120 for subsequent OTA-DPD training signals or PA model reports. For example, the network node may increase d at the next request of the PA model estimations or may revert to receiving a non-compressed message (e.g., a full PA model report including a full set of systematic bits and a full set of parity bits), in order to establish a new baseline report to serve as an anchor or reference report for future transmissions.

Based at least in part on the network node 110 and the UEs 120 performing a federated OTA-DPD training procedure or providing PA model reports using a differential scheme, the UE 120*s* or the network node 110 may conserve computing, power, network, or communication resources that may have otherwise been consumed using traditional OTA-DPD procedures. For example, based at least in part on the network node 110 and the UEs 120 performing a federated OTA-DPD training procedure or providing PA model reports using a differential scheme, the network node 110 may perform improved DPD correction procedures based on or otherwise associated with feedback from multiple UEs 120, thereby resulting in improved communications and thus reduced power, computing, and network resource consumption otherwise needed for correcting communication errors, while enabling the UEs 120 to use reduced UL resources for transmitting various reports, thereby resulting in increased bandwidth or data rates, decreased latency, and otherwise more efficient usage of network resources.

Figure 6:
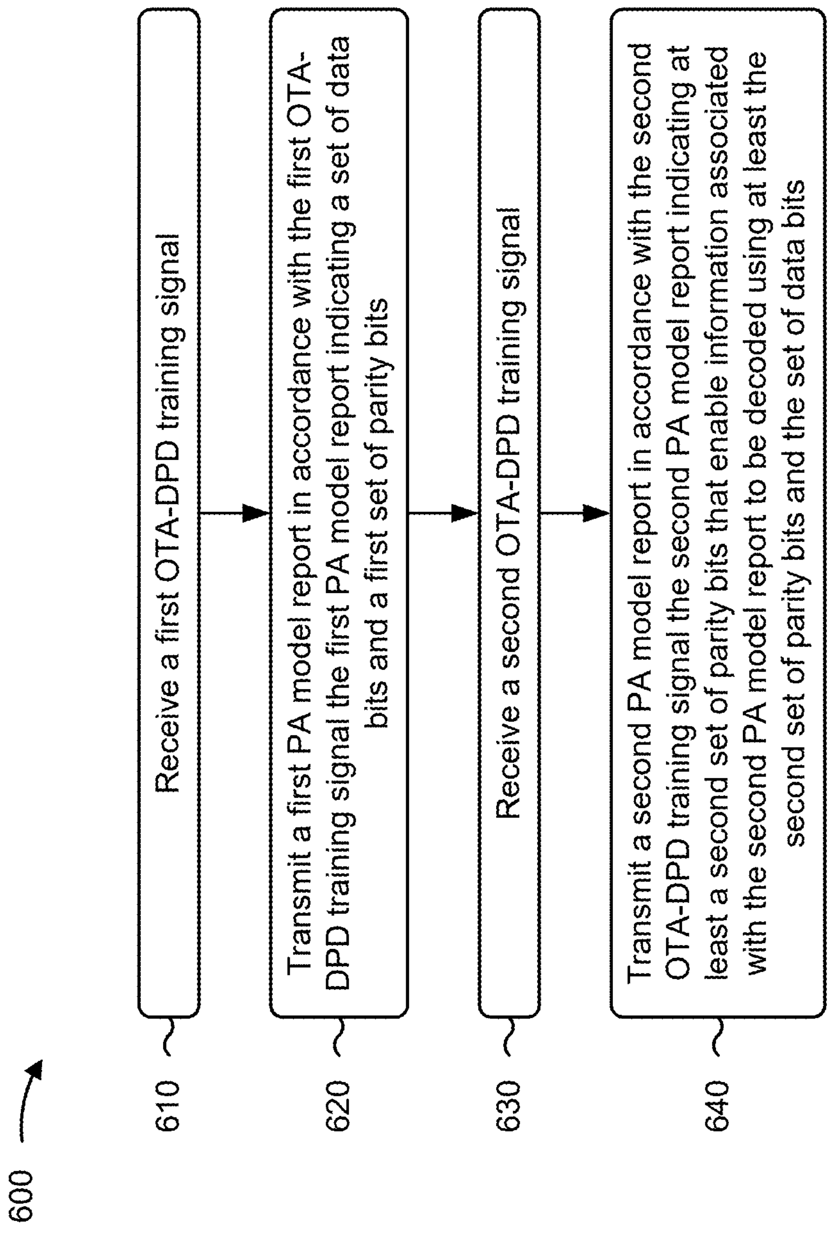
FIG. 6 is a flowchart illustrating an example process performed, for example, at a UE or an apparatus of a UE that supports OTA-DPD training procedures.

FIG. 6 is a flowchart illustrating an example process 600 performed, for example, at a UE or an apparatus of a UE that supports OTA-DPD training procedures. Example process 600 is an example where the apparatus or the UE (for example, UE 120) performs operations associated with compressed PA model reports for OTA-DPD training.

As shown in FIG. 6, in some aspects, process 600 may include receiving a first OTA-DPD training signal (block 610). For example, the UE (such as by using communication manager 806 or reception component 802, depicted in FIG. 8) may receive a first OTA-DPD training signal, as described above.

As further shown in FIG. 6, in some aspects, process 600 may include transmitting a first PA model report in accordance with the first OTA-DPD training signal, the first PA model report indicating a set of data bits and a first set of parity bits (block 620). For example, the UE (such as by using communication manager 806 or transmission component 804, depicted in FIG. 8) may transmit a first PA model report in accordance with the first OTA-DPD training signal, the first PA model report indicating a set of data bits and a first set of parity bits, as described above.

As further shown in FIG. 6, in some aspects, process 600 may include receiving a second OTA-DPD training signal (block 630). For example, the UE (such as by using communication manager 806 or reception component 802, depicted in FIG. 8) may receive a second OTA-DPD training signal, as described above.

As further shown in FIG. 6, in some aspects, process 600 may include transmitting a second PA model report in accordance with the second OTA-DPD training signal, the second PA model report indicating at least a second set of parity bits that enable information associated with the second PA model report to be decoded using at least the second set of parity bits and the set of data bits (block 640). For example, the UE (such as by using communication manager 806 or transmission component 804, depicted in FIG. 8) may transmit a second PA model report in accordance with the second OTA-DPD training signal, the second PA model report indicating at least a second set of parity bits that enable information associated with the second PA model report to be decoded using at least the second set of parity bits and the set of data bits, as described above.

Process 600 may include additional aspects, such as any single aspect or any combination of aspects described below or in connection with one or more other processes described elsewhere herein.

In a first additional aspect, process 600 includes receiving at least one of an indication that an OTA-DPD training procedure associated with the first OTA-DPD training signal and the second OTA-DPD training signal is a federated OTA-DPD training procedure performed with one or more additional UEs, or an indication of an assumed PA model for the federated OTA-DPD training procedure.

In a second additional aspect, alone or in combination with the first aspect, the set of data bits indicate a set of non-linearity coefficients associated with a PA model.

In a third additional aspect, alone or in combination with one or more of the first and second aspects, process 600 includes receiving an indication of a segment length for the second PA model report, and selecting a segment of a full PA model report as the second PA model report in accordance with the segment length.

In a fourth additional aspect, alone or in combination with one or more of the first through third aspects, selecting the segment of the full PA model report as the second PA model report includes selecting a beginning portion of a full set of parity bits associated with the full PA model report.

In a fifth additional aspect, alone or in combination with one or more of the first through fourth aspects, process 600 includes receiving an indication of a first segment length for the second PA model report, and receiving an indication of a second segment length for a third PA model report, wherein the third PA model report is associated with a third OTA-DPD training signal, and wherein the first segment length differs from the second segment length.

In a sixth additional aspect, alone or in combination with one or more of the first through fifth aspects, process 600 includes receiving the third OTA-DPD training signal, and transmitting the third PA model report in accordance with the third OTA-DPD training signal, the third PA model report including a portion of a full PA report in accordance with the second segment length.

In a seventh additional aspect, alone or in combination with one or more of the first through sixth aspects, process 600 includes receiving a request to transmit a full PA model report, receiving a third OTA-DPD training signal, and transmitting a third PA model report in accordance with the third OTA-DPD training signal, wherein the third PA model report is the full PA model report.

In an eighth additional aspect, alone or in combination with one or more of the first through seventh aspects, process 600 includes receiving a signal in accordance with a DPD correction procedure for a transmission chain that is associated with at least the first PA model report and the second PA model report.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
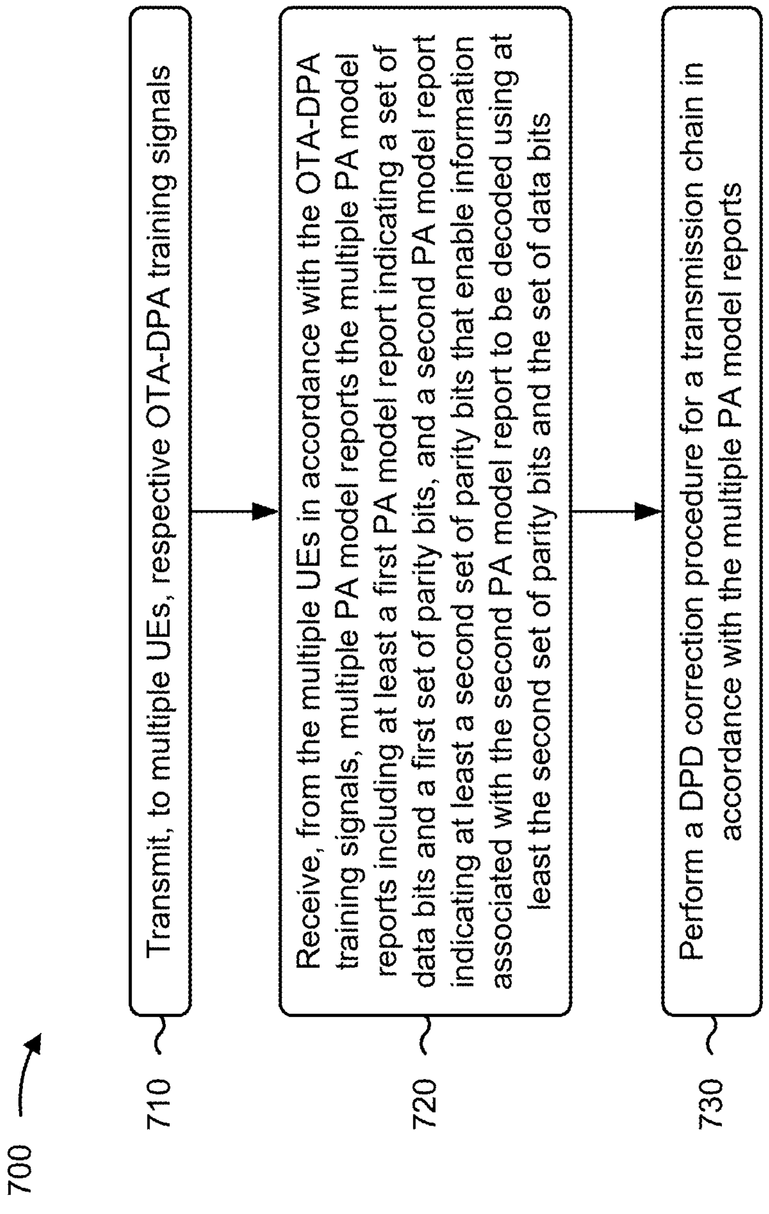
FIG. 7 is a flowchart illustrating an example process performed, for example, at a network node or an apparatus of a network node that supports OTA-DPD training procedures.

FIG. 7 is a flowchart illustrating an example process 700 performed, for example, at a network node or an apparatus of a network node that supports OTA-DPD training procedures. Example process 700 is an example where the apparatus or the network node (for example, network node 110) performs operations associated with compressed PA model reports for OTA-DPD training.

As shown in FIG. 7, in some aspects, process 700 may include transmitting, to UEs, respective OTA-DPD training signals (block 710). For example, the network node (such as by using communication manager 906 or transmission component 904, depicted in FIG. 9) may transmit, to multiple UEs, respective OTA-DPD training signals, as described above.

As further shown in FIG. 7, in some aspects, process 700 may include receiving, from the multiple UEs in accordance with the OTA-DPD training signals, multiple PA model reports, the multiple PA model reports including at least a first PA model report indicating a set of data bits and a first set of parity bits, and a second PA model report indicating at least a second set of parity bits that enable information associated with the second PA model report to be decoded using at least the second set of parity bits and the set of data bits (block 720). For example, the network node (such as by using communication manager 906 or reception component 902, depicted in FIG. 9) may receive, from the multiple UEs in accordance with the OTA-DPD training signals, multiple PA model reports, the multiple PA model reports including at least a first PA model report indicating a set of data bits and a first set of parity bits, and a second PA model report indicating at least a second set of parity bits that enable information associated with the second PA model report to be decoded using at least the second set of parity bits and the set of data bits, as described above.

As further shown in FIG. 7, in some aspects, process 700 may include performing a DPD correction procedure for a transmission chain in accordance with the multiple PA model reports (block 730). For example, the network node (such as by using communication manager 906 or DPD correction component 910, depicted in FIG. 9) may perform a DPD correction procedure for a transmission chain in accordance with the multiple PA model reports, as described above.

Process 700 may include additional aspects, such as any single aspect or any combination of aspects described below or in connection with one or more other processes described elsewhere herein.

In a first additional aspect, process 700 includes transmitting, to a first UE of the multiple UEs, a first OTA-DPD training signal, receiving, from the first UE, the first PA model report in accordance with the first OTA-DPD training signal, transmitting, to the first UE, a second OTA-DPD training signal, and receiving, from the first UE, the second PA model report in accordance with the second OTA-DPD training signal.

In a second additional aspect, alone or in combination with the first aspect, process 700 includes transmitting, to the multiple UEs, at least one of an indication that an OTA-DPD training procedure associated with the OTA-DPD training signals is a federated OTA-DPD training procedure performed with the multiple UEs, or an indication of an assumed PA model for the federated OTA-DPD training procedure.

In a third additional aspect, alone or in combination with one or more of the first and second aspects, the set of data bits indicate a set of non-linearity coefficients associated with a PA model.

In a fourth additional aspect, alone or in combination with one or more of the first through third aspects, process 700 includes transmitting, to a first UE of the multiple UEs, an indication of a segment length for the second PA model report, receiving, from the first UE, the second PA model report that indicates a segment of a full PA model report in accordance with the segment length.

In a fifth additional aspect, alone or in combination with one or more of the first through fourth aspects, the segment of the full PA model report is a beginning portion of a full set of parity bits associated with the full PA model report.

In a sixth additional aspect, alone or in combination with one or more of the first through fifth aspects, process 700 includes transmitting, to a first UE of the multiple UEs, an indication of a first segment length for the second PA model report, and transmitting, to the first UE, an indication of a second segment length for a third PA model report of the multiple PA model reports, wherein the first segment length differs from the second segment length.

In a seventh additional aspect, alone or in combination with one or more of the first through sixth aspects, process 700 includes transmitting, to a first UE of the multiple UEs, a request to transmit a full PA model report, transmitting, to the first UE, an OTA-DPD training signal, and receiving, from the first UE, a third PA model report in accordance with the OTA-DPD training signal, wherein the third PA model report is the full PA model report.

In an eighth additional aspect, alone or in combination with one or more of the first through seventh aspects, process 700 includes decoding the information associated with the second PA model report using at least the second set of parity bits and the set of data bits.

In a ninth additional aspect, alone or in combination with one or more of the first through eighth aspects, the first set of parity bits includes a first quantity of bits, the second set of parity bits includes a second quantity of bits, and process 700 includes decoding the information associated with the second PA model report using a third quantity of zeroed bits, the third quantity being a difference between the first quantity and the second quantity.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
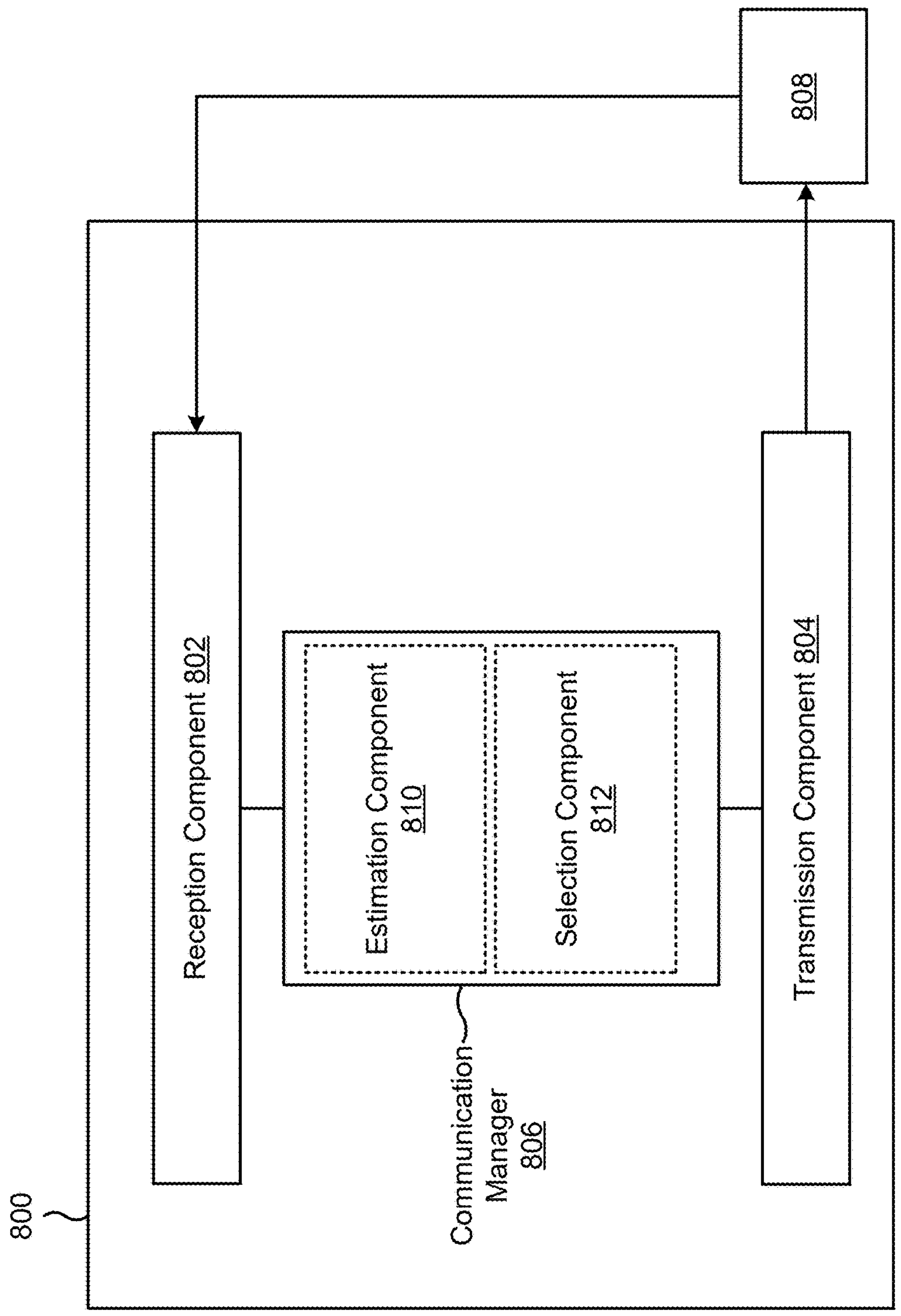
FIG. 8 is a diagram of an example apparatus for wireless communication that supports OTA-DPD training procedures.

FIG. 8 is a diagram of an example apparatus 800 for wireless communication that supports OTA-DPD training procedures. The apparatus 800 may be a UE, or a UE may include the apparatus 800. In some aspects, the apparatus 800 includes a reception component 802, a transmission component 804, and a communication manager 806, which may be in communication with one another (for example, via one or more buses). As shown, the apparatus 800 may communicate with another apparatus 808 (such as a UE 120, a network node 110, or another wireless communication device) using the reception component 802 and the transmission component 804. The communication manager 806 may be included in, or implemented via, a processing system (for example, the processing system 140). In some aspects, the communication manager 806 is the communication manager 150.

In some aspects, the apparatus 800 may be configured to or operable to perform one or more operations described herein in connection with FIGS. 5A-5D. Additionally or alternatively, the apparatus 800 may be configured to or operable to perform one or more processes described herein, such as process 600 of FIG. 6.

The reception component 802 may receive communications, such as reference signals, control information, or data communications, from the apparatus 808. The reception component 802 may provide received communications to one or more other components of the apparatus 800, such as the communication manager 806. In some aspects, the reception component 802 may perform signal processing on the received communications, and may provide the processed signals to the one or more other components in a similar manner as described above in connection with FIG. 1. In some aspects, the reception component 802 may include one or more components of the UE described above in connection with FIG. 1, such as a radio, one or more RF chains, one or more transceivers, or one or more modems, each of which may in turn be coupled with one or more antennas of the UE.

The transmission component 804 may transmit communications, such as reference signals, control information, or data communications, to the apparatus 808. In some aspects, the communication manager 806 may generate communications and may transmit the generated communications to the transmission component 804 for transmission to the apparatus 808. In some aspects, the transmission component 804 may perform signal processing on the generated communications, and may transmit the processed signals to the apparatus 808 in a similar manner as described above in connection with FIG. 1. In some aspects, the transmission component 804 may include one or more components of the UE described above in connection with FIG. 1, such as a radio, one or more RF chains, one or more transceivers, or one or more modems, each of which may in turn be coupled with one or more antennas of the UE. In some aspects, the transmission component 804 may be co-located with the reception component 802.

The communication manager 806 may receive or may cause the reception component 802 to receive a first OTA-DPD training signal. The communication manager 806 may transmit or may cause the transmission component 804 to transmit a first PA model report in accordance with the first OTA-DPD training signal, the first PA model report indicating a set of data bits and a first set of parity bits. The communication manager 806 may receive or may cause the reception component 802 to receive a second OTA-DPD training signal. The communication manager 806 may transmit or may cause the transmission component 804 to transmit a second PA model report in accordance with the second OTA-DPD training signal, the second PA model report indicating at least a second set of parity bits that enable information associated with the second PA model report to be decoded using at least the second set of parity bits and the set of data bits. In some aspects, the communication manager 806 may perform one or more operations described elsewhere herein as being performed by one or more components of the communication manager 806.

In some aspects, the communication manager 806 includes a set of components, such as an estimation component 810 or a selection component 812. Alternatively, the set of components may be separate and distinct from the communication manager 806. As used herein, the term "component" is intended to be broadly construed as hardware or a combination of hardware and at least one of software or firmware. In some aspects, one or more components of the set of components may include or may be implemented within a processing system (for example, the processing system 140). Additionally or alternatively, one or more components of the set of components may be implemented at least in part as software stored in one or more memories (for example, the memory described with reference to FIG. 1). For example, a component (or a portion of a component) may be implemented as instructions or code stored in a non-transitory computer-readable medium and executable by the processing system to perform the functions or operations of the component.

The reception component 802 may receive a first OTA-DPD training signal. The transmission component 804 or the estimation component 810 may transmit a first PA model report in accordance with the first OTA-DPD training signal, the first PA model report indicating a set of data bits and a first set of parity bits. The reception component 802 may receive a second OTA-DPD training signal. The transmission component 804 or the estimation component may transmit a second PA model report in accordance with the second OTA-DPD training signal, the second PA model report indicating at least a second set of parity bits that enable information associated with the second PA model report to be decoded using at least the second set of parity bits and the set of data bits.

The reception component 802 may receive at least one of an indication that an OTA-DPD training procedure associated with the first OTA-DPD training signal and the second OTA-DPD training signal is a federated OTA-DPD training procedure performed with one or more additional UEs, or an indication of an assumed PA model for the federated OTA-DPD training procedure.

The reception component 802 or the selection component 812 may receive an indication of a segment length for the second PA model report.

The selection component 812 may select a segment of a full PA model report as the second PA model report in accordance with the segment length.

The reception component 802 or the selection component 812 may receive an indication of a first segment length for the second PA model report.

The reception component 802 or the selection component 812 may receive an indication of a second segment length for a third PA model report, wherein the third PA model report is associated with a third OTA-DPD training signal, and wherein the first segment length differs from the second segment length.

The reception component 802 may receive the third OTA-DPD training signal.

The transmission component 804, the estimation component 810, or the selection component 812 may transmit the third PA model report in accordance with the third OTA-DPD training signal, the third PA model report including a portion of a full PA report in accordance with the second segment length.

The reception component 802 may receive a request to transmit a full PA model report.

The transmission component 804 or the estimation component 810 may transmit a third PA model report in accordance with the third OTA-DPD training signal, wherein the third PA model report is the full PA model report.

The reception component 802 may receive a signal in accordance with a DPD correction procedure for a transmission chain that is associated with at least the first PA model report and the second PA model report.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
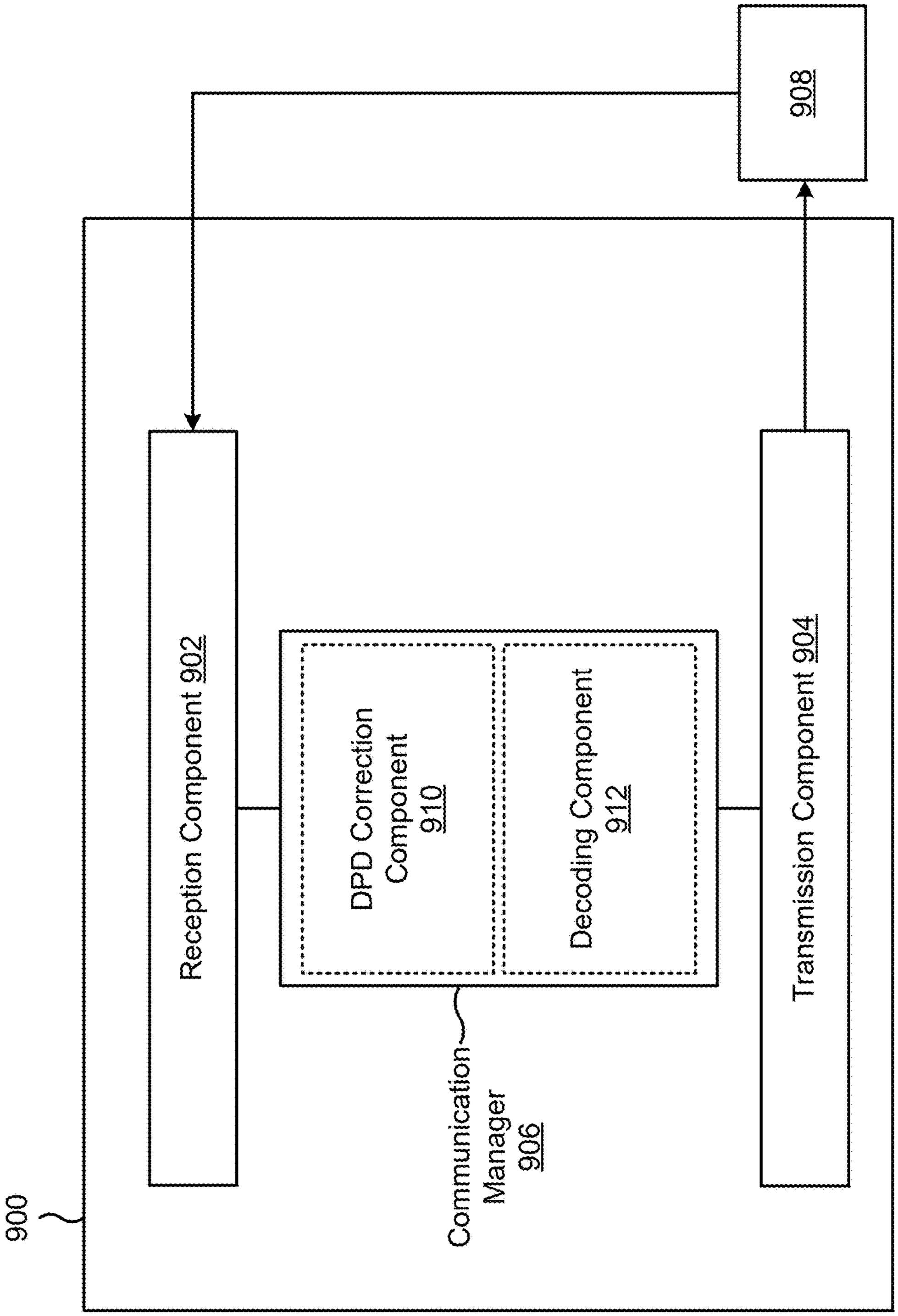
FIG. 9 is a diagram of an example apparatus for wireless communication that supports OTA-DPD training procedures.

FIG. 9 is a diagram of an example apparatus 900 for wireless communication that supports OTA-DPD training procedures. The apparatus 900 may be a network node, or a network node may include the apparatus 900. In some aspects, the apparatus 900 includes a reception component 902, a transmission component 904, and a communication manager 906, which may be in communication with one another (for example, via one or more buses). As shown, the apparatus 900 may communicate with another apparatus 908 (such as a UE 120, a network node 110, or another wireless communication device) using the reception component 902 and the transmission component 904. The communication manager 906 may be included in, or implemented via, a processing system (for example, the processing system 145). In some aspects, the communication manager 906 is the communication manager 155.

In some aspects, the apparatus 900 may be configured to or operable to perform one or more operations described herein in connection with FIGS. 5A-5D. Additionally or alternatively, the apparatus 900 may be configured to or operable to perform one or more processes described herein, such as process 700 of FIG. 7.

The reception component 902 may receive communications, such as reference signals, control information, or data communications, from the apparatus 908. The reception component 902 may provide received communications to one or more other components of the apparatus 900, such as the communication manager 906. In some aspects, the reception component 902 may perform signal processing on the received communications, and may provide the processed signals to the one or more other components in a similar manner as described above in connection with FIG. 1. In some aspects, the reception component 902 may include one or more components of the network node described above in connection with FIG. 1, such as a radio, one or more RF chains, one or more transceivers, or one or more modems, each of which may in turn be coupled with one or more antennas of the network node.

The transmission component 904 may transmit communications, such as reference signals, control information, or data communications, to the apparatus 908. In some aspects, the communication manager 906 may generate communications and may transmit the generated communications to the transmission component 904 for transmission to the apparatus 908. In some aspects, the transmission component 904 may perform signal processing on the generated communications, and may transmit the processed signals to the apparatus 908 in a similar manner as described above in connection with FIG. 1. In some aspects, the transmission component 904 may include one or more components of the network node described above in connection with FIG. 1, such as a radio, one or more RF chains, one or more transceivers, or one or more modems, each of which may in turn be coupled with one or more antennas of the network node. In some aspects, the transmission component 904 may be co-located with the reception component 902.

The communication manager 906 may transmit or may cause the transmission component 904 to transmit, to multiple UEs, respective OTA-DPD training signals. The communication manager 906 may receive or may cause the reception component 902 to receive, from the multiple UEs in accordance with the OTA-DPD training signals, multiple PA model reports, the multiple PA model reports including at least a first PA model report indicating a set of data bits and a first set of parity bits, and a second PA model report indicating at least a second set of parity bits that enable information associated with the second PA model report to be decoded using at least the second set of parity bits and the set of data bits. The communication manager 906 may perform a DPD correction procedure for a transmission chain in accordance with the multiple PA model reports. In some aspects, the communication manager 906 may perform one or more operations described elsewhere herein as being performed by one or more components of the communication manager 906.

In some aspects, the communication manager 906 includes a set of components, such as a DPD correction component 910 or a decoding component 912. Alternatively, the set of components may be separate and distinct from the communication manager 906. As used herein, the term "component" is intended to be broadly construed as hardware or a combination of hardware and at least one of software or firmware. In some aspects, one or more components of the set of components may include or may be implemented within a processing system (for example, the processing system 145). Additionally or alternatively, one or more components of the set of components may be implemented at least in part as software stored in one or more memories (for example, the memory described with reference to FIG. 1). For example, a component (or a portion of a component) may be implemented as instructions or code stored in a non-transitory computer-readable medium and executable by the processing system to perform the functions or operations of the component.

The transmission component 904 may transmit, to multiple UEs, respective OTA-DPD training signals. The reception component 902 may receive, from the multiple UEs in accordance with the OTA-DPD training signals, multiple PA model reports the multiple PA model reports including at least a first PA model report indicating a set of data bits and a first set of parity bits, and a second PA model report indicating at least a second set of parity bits that enable information associated with the second PA model report to be decoded using at least the second set of parity bits and the set of data bits. The DPD correction component 910 may perform a DPD correction procedure for a transmission chain in accordance with the multiple PA model reports.

The transmission component 904 may transmit, to a first UE of the multiple UEs, a first OTA-DPD training signal.

The reception component 902 may receive, from the first UE, the first PA model report in accordance with the first OTA-DPD training signal.

The transmission component 904 may transmit, to the first UE, a second OTA-DPD training signal.

The reception component 902 may receive, from the first UE, the second PA model report in accordance with the second OTA-DPD training signal.

The transmission component 904 may transmit, to the multiple UEs, at least one of an indication that an OTA-DPD training procedure associated with the OTA-DPD training signals is a federated OTA-DPD training procedure performed with the multiple UEs, or an indication of an assumed PA model for the federated OTA-DPD training procedure.

The transmission component 904 may transmit, to a first UE of the multiple UEs, an indication of a segment length for the second PA model report.

The reception component 902 may receive, from the first UE, the second PA model report that indicates a segment of a full PA model report in accordance with the segment length.

The transmission component 904 may transmit, to a first UE of the multiple UEs, an indication of a first segment length for the second PA model report.

The transmission component 904 may transmit, to the first UE, an indication of a second segment length for a third PA model report of the multiple PA model reports, wherein the first segment length differs from the second segment length.

The transmission component 904 may transmit, to a first UE of the multiple UEs, a request to transmit a full PA model report.

The transmission component 904 may transmit, to the first UE, an OTA-DPD training signal.

The reception component 902 may receive, from the first UE, a third PA model report in accordance with the OTA-DPD training signal wherein the third PA model report is the full PA model report.

The decoding component 912 may decode the information associated with the second PA model report using at least the second set of parity bits and the set of data bits.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication by a user equipment (UE), comprising: receiving a first over-the-air digital pre-distortion (OTA-DPD) training signal; transmitting a first power amplifier (PA) model report in accordance with the first OTA-DPD training signal, the first PA model report indicating a set of data bits and a first set of parity bits; receiving a second OTA-DPD training signal; and transmitting a second PA model report in accordance with the second OTA-DPD training signal, the second PA model report indicating at least a second set of parity bits that enable information associated with the second PA model report to be decoded using at least the second set of parity bits and the set of data bits.

Aspect 2: The method of Aspect 1, further comprising receiving at least one of: an indication that an OTA-DPD training procedure associated with the first OTA-DPD training signal and the second OTA-DPD training signal is a federated OTA-DPD training procedure performed with one or more additional UEs, or an indication of an assumed PA model for the federated OTA-DPD training procedure.

Aspect 3: The method of any of Aspects 1-2, wherein the set of data bits indicate a set of non-linearity coefficients associated with a PA model.

Aspect 4: The method of any of Aspects 1-3, further comprising: receiving an indication of a segment length for the second PA model report; and selecting a segment of a full PA model report as the second PA model report in accordance with the segment length.

Aspect 5: The method of Aspect 4, wherein selecting the segment of the full PA model report as the second PA model report includes selecting a beginning portion of a full set of parity bits associated with the full PA model report.

Aspect 6: The method of any of Aspects 1-5, further comprising: receiving an indication of a first segment length for the second PA model report; and receiving an indication of a second segment length for a third PA model report, wherein the third PA model report is associated with a third OTA-DPD training signal, and wherein the first segment length differs from the second segment length.

Aspect 7: The method of Aspect 6, further comprising: receiving the third OTA-DPD training signal; and transmitting the third PA model report in accordance with the third OTA-DPD training signal, the third PA model report including a portion of a full PA report in accordance with the second segment length.

Aspect 8: The method of any of Aspects 1-7, further comprising: receiving a request to transmit a full PA model report; receiving a third OTA-DPD training signal; and transmitting a third PA model report in accordance with the third OTA-DPD training signal, wherein the third PA model report is the full PA model report.

Aspect 9: The method of any of Aspects 1-8, further comprising receiving a signal in accordance with a DPD correction procedure for a transmission chain that is associated with at least the first PA model report and the second PA model report.

Aspect 10: A method of wireless communication by a network node, comprising: transmitting, to multiple user equipments (UEs), respective over-the-air digital pre-distortion (OTA-DPD) training signals; receiving, from the multiple UEs in accordance with the OTA-DPD training signals, multiple power amplifier (PA) model reports, the multiple PA model reports including at least a first PA model report indicating a set of data bits and a first set of parity bits, and a second PA model report indicating at least a second set of parity bits that enable information associated with the second PA model report to be decoded using at least the second set of parity bits and the set of data bits; and performing a DPD correction procedure for a transmission chain in accordance with the multiple PA model reports.

Aspect 11: The method of Aspect 10, further comprising: transmitting, to a first UE of the multiple UEs, a first OTA-DPD training signal; receiving, from the first UE, the first PA model report in accordance with the first OTA-DPD training signal; transmitting, to the first UE, a second OTA-DPD training signal; and receiving, from the first UE, the second PA model report in accordance with the second OTA-DPD training signal.

Aspect 12: The method of any of Aspects 10-11, further comprising transmitting, to the multiple UEs, at least one of: an indication that an OTA-DPD training procedure associated with the OTA-DPD training signals is a federated OTA-DPD training procedure performed with the multiple UEs, or an indication of an assumed PA model for the federated OTA-DPD training procedure.

Aspect 13: The method of any of Aspects 10-12, wherein the set of data bits indicate a set of non-linearity coefficients associated with a PA model.

Aspect 14: The method of any of Aspects 10-13, further comprising transmitting, to a first UE of the multiple UEs, an indication of a segment length for the second PA model report, receiving, from the first UE, the second PA model report that indicates a segment of a full PA model report in accordance with the segment length.

Aspect 15: The method of Aspect 14, wherein the segment of the full PA model report is a beginning portion of a full set of parity bits associated with the full PA model report.

Aspect 16: The method of any of Aspects 10-15, further comprising: transmitting, to a first UE of the multiple UEs, an indication of a first segment length for the second PA model report; and transmitting, to the first UE, an indication of a second segment length for a third PA model report of the multiple PA model reports, wherein the first segment length differs from the second segment length.

Aspect 17: The method of any of Aspects 10-16, further comprising: transmitting, to a first UE of the multiple UEs, a request to transmit a full PA model report; transmitting, to the first UE, an OTA-DPD training signal; and receiving, from the first UE, a third PA model report in accordance with the OTA-DPD training signal, wherein the third PA model report is the full PA model report.

Aspect 18: The method of any of Aspects 10-17, further comprising decoding the information associated with the second PA model report using at least the second set of parity bits and the set of data bits.

Aspect 19: The method of Aspect 18, wherein the first set of parity bits includes a first quantity of bits, wherein the second set of parity bits includes a second quantity of bits, and wherein the method further comprises decoding the information associated with the second PA model report using a third quantity of zeroed bits, the third quantity being a difference between the first quantity and the second quantity.

Aspect 20: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-19.

Aspect 21: An apparatus for wireless communication at a device, the apparatus comprising one or more memories and one or more processors coupled to the one or more memories, the one or more processors configured to cause the device to perform the method of one or more of Aspects 1-19.

Aspect 22: An apparatus for wireless communication, the apparatus comprising at least one means for performing the method of one or more of Aspects 1-19.

Aspect 23: A non-transitory computer-readable medium storing code for wireless communication, the code comprising instructions executable by one or more processors to perform the method of one or more of Aspects 1-19.

Aspect 24: A non-transitory computer-readable medium storing a set of instructions for wireless communication, the set of instructions comprising one or more instructions that, when executed by one or more processors of a device, cause the device to perform the method of one or more of Aspects 1-19.

Aspect 25: A device for wireless communication, the device comprising a processing system that includes one or more processors and one or more memories coupled with the one or more processors, the processing system configured to cause the device to perform the method of one or more of Aspects 1-19.

Aspect 26: An apparatus for wireless communication at a device, the apparatus comprising one or more memories and one or more processors coupled to the one or more memories, the one or more processors individually or collectively configured to cause the device to perform the method of one or more of Aspects 1-19.

The foregoing disclosure provides illustration and description but is not intended to be exhaustive or to limit the aspects to the precise forms disclosed. Modifications and variations may be made in light of the above disclosure or may be acquired from practice of the aspects. No element, act, or instruction described herein should be construed as critical or essential unless explicitly described as such.

It will be apparent that systems or methods described herein may be implemented in different forms of hardware or a combination of hardware and software. The actual specialized control hardware or software used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, the articles "a" and "an" are intended to refer to one or more items and may be used interchangeably with "one or more" or "at least one." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or "a single one" or similar language is used. Also, as used herein, the terms "has," "have," "having," "comprise," "comprising," "include" and "including," and derivatives thereof or similar terms are intended to be open-ended terms that do not limit an element that they modify (for example, an element "having" A may also have B). Also, as used herein, the term "or" is intended to be inclusive when used in a series and may be used interchangeably with "and/or," unless explicitly stated otherwise (for example, if used in combination with "either" or "only one of"). As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

As used herein, the term "determine" or "determining" encompasses a wide variety of actions and, therefore, "determining" can include calculating, computing, processing, deriving, estimating, investigating, looking up (such as via looking up in a table, a database, or another data structure), searching, inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing, or other such similar actions.

As used herein, the phrase "based on" is intended to mean "based at least in part on" or "based on or otherwise in association with" unless explicitly stated otherwise. As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the scope of all aspects described herein. Many of these features may be combined in ways not specifically recited in the claims or disclosed in the specification. The disclosure of various aspects includes each dependent claim in combination with every other claim in the claim set.

What is claimed is:

1. A user equipment (UE) for wireless communication, comprising:

a processing system that includes one or more processors and one or more memories coupled with the one or more processors, the processing system configured to cause the UE to:

receive a first over-the-air digital pre-distortion (OTA-DPD) training signal;

transmit a first power amplifier (PA) model report in accordance with the first OTA-DPD training signal, the first PA model report indicating a set of data bits and a first set of parity bits;

receive a second OTA-DPD training signal; and transmit a second PA model report in accordance with the second OTA-DPD training signal, the second PA model report indicating at least a second set of parity bits that enable information associated with the second PA model report to be decoded using at least the second set of parity bits and the set of data bits.

2. The UE of claim 1, wherein the processing system is further configured to cause the UE to receive at least one of:

an indication that an OTA-DPD training procedure associated with the first OTA-DPD training signal and the second OTA-DPD training signal is a federated OTA-DPD training procedure performed with one or more additional UEs, or an indication of an assumed PA model for the federated OTA-DPD training procedure.

3. The UE of claim 1, wherein the set of data bits indicate a set of non-linearity coefficients associated with a PA model.

4. The UE of claim 1, wherein the processing system is further configured to cause the UE to:

receive an indication of a segment length for the second PA model report; and select a segment of a full PA model report as the second PA model report in accordance with the segment length.

5. The UE of claim 4, wherein, to cause the UE to select the segment of the full PA model report as the second PA model report, the processing system is configured to cause the UE to select a beginning portion of a full set of parity bits associated with the full PA model report.

6. The UE of claim 1, wherein the processing system is further configured to cause the UE to:

receive an indication of a first segment length for the second PA model report; and receive an indication of a second segment length for a third PA model report, wherein the third PA model report is associated with a third OTA-DPD training signal, and wherein the first segment length differs from the second segment length.

7. The UE of claim 6, wherein the processing system is further configured to cause the UE to:

receive the third OTA-DPD training signal; and transmit the third PA model report in accordance with the third OTA-DPD training signal, the third PA model report including a portion of a full PA report in accordance with the second segment length.

8. The UE of claim 1, wherein the processing system is further configured to cause the UE to:

receive a request to transmit a full PA model report;

receive a third OTA-DPD training signal; and transmit a third PA model report in accordance with the third OTA-DPD training signal, wherein the third PA model report is the full PA model report.

9. The UE of claim 1, wherein the processing system is further configured to cause the UE to receive a signal in accordance with a DPD correction procedure for a transmission chain that is associated with at least the first PA model report and the second PA model report.

10. A network node for wireless communication, comprising:

a processing system that includes one or more processors and one or more memories coupled with the one or more processors, the processing system configured to cause the network node to:

transmit, to multiple user equipments (UEs), respective over-the-air digital pre-distortion (OTA-DPD) training signals;

receive, from the multiple UEs in accordance with the OTA-DPD training signals, multiple power amplifier (PA) model reports, the multiple PA model reports including at least a first PA model report indicating a set of data bits and a first set of parity bits, and a second PA model report indicating at least a second set of parity bits that enable information associated with the second PA model report to be decoded using at least the second set of parity bits and the set of data bits; and perform a DPD correction procedure for a transmission chain in accordance with the multiple PA model reports.

11. The network node of claim 10, wherein the processing system is further configured to cause the network node to:

transmit, to a first UE of the multiple UEs, a first OTA-DPD training signal;

receive, from the first UE, the first PA model report in accordance with the first OTA-DPD training signal;

transmit, to the first UE, a second OTA-DPD training signal; and receive, from the first UE, the second PA model report in accordance with the second OTA-DPD training signal.

12. The network node of claim 10, wherein the processing system is further configured to cause the network node to transmit, to the multiple UEs, at least one of:

an indication that an OTA-DPD training procedure associated with the OTA-DPD training signals is a federated OTA-DPD training procedure performed with the multiple UEs, or an indication of an assumed PA model for the federated OTA-DPD training procedure.

13. The network node of claim 10, wherein the set of data bits indicate a set of non-linearity coefficients associated with a PA model.

14. The network node of claim 10, wherein the processing system is further configured to cause the network node to:

transmit, to a first UE of the multiple UEs, an indication of a segment length for the second PA model report; and receive, from the first UE, the second PA model report that indicates a segment of a full PA model report in accordance with the segment length.

15. The network node of claim 14, wherein the segment of the full PA model report is a beginning portion of a full set of parity bits associated with the full PA model report.

16. The network node of claim 10, wherein the processing system is further configured to cause the network node to:

transmit, to a first UE of the multiple UEs, an indication of a first segment length for the second PA model report; and transmit, to the first UE, an indication of a second segment length for a third PA model report of the multiple PA model reports, wherein the first segment length differs from the second segment length.

17. The network node of claim 10, wherein the processing system is further configured to cause the network node to:

transmit, to a first UE of the multiple UEs, a request to transmit a full PA model report;

transmit, to the first UE, an OTA-DPD training signal; and receive, from the first UE, a third PA model report in accordance with the OTA-DPD training signal, wherein the third PA model report is the full PA model report.

18. The network node of claim 10, wherein the processing system is further configured to cause the network node to decode the information associated with the second PA model report using at least the second set of parity bits and the set of data bits.

19. The network node of claim 18, wherein the first set of parity bits includes a first quantity of bits, wherein the second set of parity bits includes a second quantity of bits, and wherein the processing system is further configured to cause the network node to decode the information associated with the second PA model report using a third quantity of zeroed bits, the third quantity being a difference between the first quantity and the second quantity.

20. A method of wireless communication by a user equipment (UE), comprising:

receiving a first over-the-air digital pre-distortion (OTA-DPD) training signal;

transmitting a first power amplifier (PA) model report in accordance with the first OTA-DPD training signal, the first PA model report indicating a set of data bits and a first set of parity bits;

receiving a second OTA-DPD training signal; and transmitting a second PA model report in accordance with the second OTA-DPD training signal, the second PA model report indicating at least a second set of parity bits that enable information associated with the second PA model report to be decoded using at least the second set of parity bits and the set of data bits.

21. The method of claim 20, wherein the set of data bits indicate a set of non-linearity coefficients associated with a PA model.

22. The method of claim 20, further comprising:

receiving an indication of a segment length for the second PA model report; and selecting a segment of a full PA model report as the second PA model report in accordance with the segment length.

23. The method of claim 22, wherein selecting the segment of the full PA model report as the second PA model report includes selecting a beginning portion of a full set of parity bits associated with the full PA model report.

24. The method of claim 20, further comprising:

receiving an indication of a first segment length for the second PA model report; and receiving an indication of a second segment length for a third PA model report, wherein the third PA model report is associated with a third OTA-DPD training signal, and wherein the first segment length differs from the second segment length.

25. The method of claim 24, further comprising:

receiving the third OTA-DPD training signal; and transmitting the third PA model report in accordance with the third OTA-DPD training signal, the third PA model report including a portion of a full PA report in accordance with the second segment length.

26. The method of claim 20, further comprising:

receiving a request to transmit a full PA model report;

receiving a third OTA-DPD training signal; and transmitting a third PA model report in accordance with the third OTA-DPD training signal, wherein the third PA model report is the full PA model report.

27. A method of wireless communication by a network node, comprising:

transmitting, to multiple user equipments (UEs), respective over-the-air digital pre-distortion (OTA-DPD) training signals;

receiving, from the multiple UEs in accordance with the OTA-DPD training signals, multiple power amplifier (PA) model reports, the multiple PA model reports including at least a first PA model report indicating a set of data bits and a first set of parity bits, and a second PA model report indicating at least a second set of parity bits that enable information associated with the second PA model report to be decoded using at least the second set of parity bits and the set of data bits; and performing a DPD correction procedure for a transmission chain in accordance with the multiple PA model reports.

28. The method of claim 27, further comprising transmitting, to the multiple UEs, at least one of:

an indication that an OTA-DPD training procedure associated with the OTA-DPD training signals is a federated OTA-DPD training procedure performed with the multiple UEs, or an indication of an assumed PA model for the federated OTA-DPD training procedure.

29. The method of claim 27, further comprising decoding the information associated with the second PA model report using at least the second set of parity bits and the set of data bits.

30. The method of claim 29, wherein the first set of parity bits includes a first quantity of bits, wherein the second set of parity bits includes a second quantity of bits, and wherein the method further comprises decoding the information associated with the second PA model report using a third quantity of zeroed bits, the third quantity being a difference between the first quantity and the second quantity.

* * * * *